United States Patent
Andrews et al.

(10) Patent No.: US 12,104,746 B2
(45) Date of Patent: Oct. 1, 2024

(54) DEPLOYABLE STRUCTURES, METHODS INCLUDING THE SAME AND SYSTEMS INCLUDING THE SAME

(71) Applicant: BRIGHAM YOUNG UNIVERSITY, Provo, UT (US)

(72) Inventors: David W. Andrews, Provo, UT (US); Spencer P. Magleby, Provo, UT (US); Larry L. Howell, Orem, UT (US)

(73) Assignee: BRIGHAM YOUNG UNIVERSITY, Provo, UT (US)

( * ) Notice: Subject to any disclaimer, the term of this patent is extended or adjusted under 35 U.S.C. 154(b) by 5 days.

(21) Appl. No.: 17/726,282

(22) Filed: Apr. 21, 2022

(65) Prior Publication Data
US 2022/0341540 A1    Oct. 27, 2022

Related U.S. Application Data

(60) Provisional application No. 63/178,153, filed on Apr. 22, 2021.

(51) Int. Cl.
*F16M 11/00* (2006.01)
*F16M 13/02* (2006.01)

(52) U.S. Cl.
CPC ................. *F16M 13/022* (2013.01)

(58) Field of Classification Search
CPC ....... F16M 13/022; F16M 11/38; F16M 11/10
See application file for complete search history.

(56) References Cited

U.S. PATENT DOCUMENTS

| | | | | |
|---|---|---|---|---|
| 3,210,874 | A * | 10/1965 | Nichols | B42D 5/043 248/459 |
| 4,726,556 | A * | 2/1988 | Weir | A47B 27/18 248/460 |
| 8,567,740 | B2 * | 10/2013 | Tarnutzer | B42D 9/00 361/679.55 |
| 8,936,226 | B2 * | 1/2015 | Chang | A47B 19/00 312/265.5 |

(Continued)

OTHER PUBLICATIONS

U.S. Appl. No. 63/178,153, filed Apr. 22, 2021.

(Continued)

*Primary Examiner* — Amy J. Sterling
(74) *Attorney, Agent, or Firm* — Dorsey & Whitney LLP

(57) ABSTRACT

An example deployable structure includes at least one base member, at least one first articulable member, at least one second articulable member, and at least one interference member. The deployable structure must include at least one base member, at least one first articulable member, at least one second articulable member, and at least one interference member otherwise the deployable structure may not be switchable between the compact and deployed states thereof. The base member is articulably connected to the first articulable member using a first hinge, the first articulable member is articulably connected to the second articulable member using a second hinge, and the interference member is articulably connected to the second articulable member using a third hinge. The interference member is also attached to the base member, for example, using a fourth hinge. The deployable structure is configured to switch from at least a compact state to a deployed state.

23 Claims, 18 Drawing Sheets

(56) References Cited

U.S. PATENT DOCUMENTS

| | | | |
|---|---|---|---|
| 11,297,941 B1* | 4/2022 | Hadar | A47B 23/043 |
| 11,523,684 B1* | 12/2022 | Huang | A47B 23/043 |
| 11,556,147 B2* | 1/2023 | Rizvi | F16M 11/2021 |
| 2008/0006753 A1* | 1/2008 | Campagnoli | A47B 23/043 |
| | | | 248/398 |
| 2009/0289166 A1* | 11/2009 | Hopfer | A47B 23/043 |
| | | | 248/456 |
| 2021/0207762 A1* | 7/2021 | He | F16M 11/041 |

OTHER PUBLICATIONS

Andrews, "Incorporating Stability in Deployable Origami-based Engineering Applications", Brigham Young University BYU ScholarsArchive, 2020, pp. 1-100.

* cited by examiner

DEPLOYABLE STRUCTURES, METHODS INCLUDING THE SAME AND SYSTEMS INCLUDING THE SAME

CROSS-REFERENCE TO RELATED APPLICATION

This application claims priority to U.S. Provisional Patent Application No. 63/178,153 filed on Apr. 22, 2021, the disclosure of which is incorporated herein, in its entirety, by this reference.

STATEMENT REGARDING FEDERALLY SPONSORED RESEARCH OR DEVELOPMENT

This invention was made with government support under Grant Number 1663345 awarded by the National Institutes of Health and Grant Number FA9550-19-1-0290 awarded by the Air Force Office of Scientific Research. The Government has certain rights in this invention.

BACKGROUND

Deployable structures have found uses in numerous engineering and design applications, such as small soft robots, DNA mechanisms, transformable metamaterials, energy absorbers, and optimized jumping mechanisms. In many applications, it is necessary to block motion and provide stability in a desired deployed state.

In some embodiments, conventional deployable structures include deployable transcrease hard stop models that block motion of an origami pattern in a desired fold state, while maintaining the original crease locations. Deployable transcrease hard stops implement cuts into origami, making the deployable structures kirigami (sometimes referred to as "Pop-up Origami"). Since these models were developed for origami, they are based on the zero thickness assumption. Therefore, they cannot be directly implemented in deployable structures that have non-negligible thickness. Various thickness accommodation techniques have been developed for adapting origami designs to thicker materials. These techniques usually involve the strategic removal or arrangement of material to enable folding.

SUMMARY

Embodiments are directed to deployable structures, methods of using the deployable structures, and systems that include the deployable structures. In an embodiment, a deployable structure is disclosed. The deployable structure includes at least one base member, at least one first articulable member articulably connected to the at least one base member at a first hinge, at least one second articulable member articulably connected to the at least one first articulable member at a second hinge, and at least one interference member articulably connected to the at least one second articulable member at a third hinge and connected to the at least one base member. The deployable structure is configured to switch from at least one compact state to a deployed state.

In an embodiment, a method of using a deployable structure is disclosed. The method includes providing the deployable structure. The deployable structure includes at least one base member, at least one first articulable member articulably connected to the at least one base member at a first hinge, at least one second articulable member articulably connected to the at least one first articulable member at a second hinge, and at least one interference member articulably connected to the at least one second articulable member at a third hinge and connected to the at least one base member. The method also includes switching the deployable structure from a compact state to a deployed state.

In an embodiment, a deployable structure is disclosed. The deployable structure includes at least one base member, at least one first articulable member articulably connected to the at least one base member at a first hinge, at least one second articulable member articulably connected to the at least one first articulable member at a second hinge, and at least one interference member articulably connected to the at least one second articulable member at a third hinge and articulably connected to the at least one base member at a fourth hinge. The deployable structure is configured to switch from at least one folded state to a deployed state. The at least one interference member abuts a surface of the at least one base member when the deployable structure is in the deployed state. The at least one base member defines a first recess configured to receive at least a portion of the at least one interference member when the deployable structure is in the at least one compact state and the at least one first articulable member defines a second recess configured to receive at least a portion of the at least one second articulable member when the deployable structure is in the at least one compact state.

Features from any of the disclosed embodiments may be used in combination with one another, without limitation. In addition, other features and advantages of the present disclosure will become apparent to those of ordinary skill in the art through consideration of the following detailed description and the accompanying drawings.

BRIEF DESCRIPTION OF THE DRAWINGS

The drawings illustrate several embodiments of the present disclosure, wherein identical reference numerals refer to identical or similar elements or features in different views or embodiments shown in the drawings.

DETAILED DESCRIPTION

Figure 1:
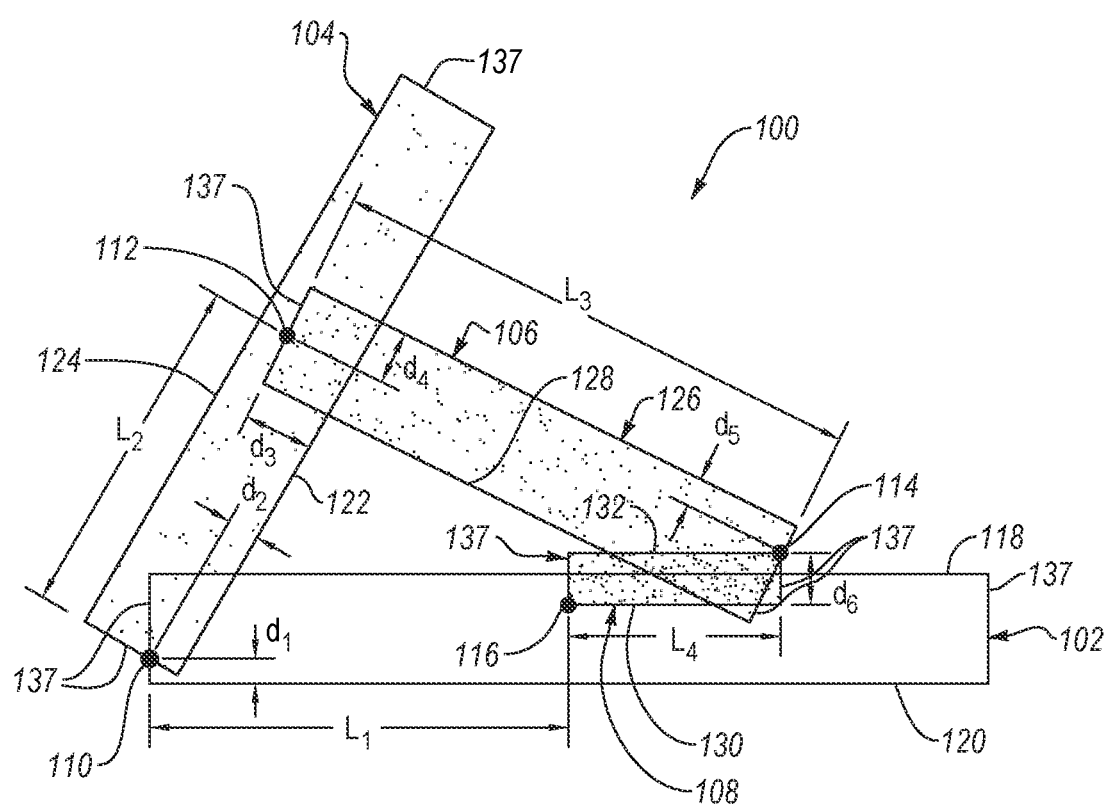
FIG. 1 is a schematic of a deployable structure in the deployed state thereof, according to an embodiment.

Embodiments are directed to deployable structures, methods of using the deployable structures, and systems that include the deployable structures. An example deployable structure includes at least one base member, at least one first articulable member, at least one second articulable member, and at least one interference member. The deployable structure must include the at least one base member, the at least one first articulable member, at least one second articulable member, and at least one interference member otherwise the deployable structure may not be switchable between the compact (e.g., folded and/or flat-folded states) and deployed states thereof. The base member is articulably connected to the first articulable member using a first hinge, the first articulable member is articulably connected to the second articulable member using a second hinge, and the interference member is articulably connected to the second articulable member using a third hinge. The interference member is also attached to the base member, for example, using a fourth hinge. The deployable structure is configured to switch from at least a compact state to a deployed state. The deployable structure may be more compact and/or exhibit a smaller thickness when in the compact state than when in the deployed state. The deployable structure is configured to maintain the deployed state and prevent further movement from the compact state due the members of the deployable structure self-interfering with each other (e.g., the interference member abutting the base member).

Methods of using the deployable structure may include switching the deployable structure from the compact state to the deployed state. In an example, switching the deployable structure from the compact state to the deployed state may include moving (e.g., rotating) at least a portion of one or more of the first articulable member, the second articulable member, or the interference member relative to the base member. The deployable structure may be in the deployed state once self-interference between the members of the deployable structure prevent further movement. The deployable structure may then be switched from the deployed state to the compact state by reversing the method.

The deployable structures disclosed herein are an improvement over at least some conventional deployable structures. For example, some conventional deployable structures that have non-negligible thickness rely on the strategic removal or addition of elements (e.g., trusses) to block motion thereof and to maintain such conventional deployable structures in the deployed states hereof. The removal or addition of elements makes operation of the conventional deployable structures complex to use and makes compact storage of the conventional deployable structures difficult or impossible. Other conventional deployable structures exhibit a layered structure when in the compact state thereof which prevents the conventional deployable structures from exhibiting a dense compact state. In other words, the layered structure of such conventional deployable structures makes compact storage of the conventional deployable structures difficult or impossible. Meanwhile, as disclosed in more detail below, the deployable structures disclosed herein may not require the removal or addition of elements or may not exhibit a layered structure. Instead, the deployable structures disclosed herein may utilize the non-negligible thickness thereof to allow for self-interference to block motion when the deployable structures are in the deployed state. Thus, the deployable structures disclosed herein may be an improvement over conventional deployable structures.

Figure 2A:
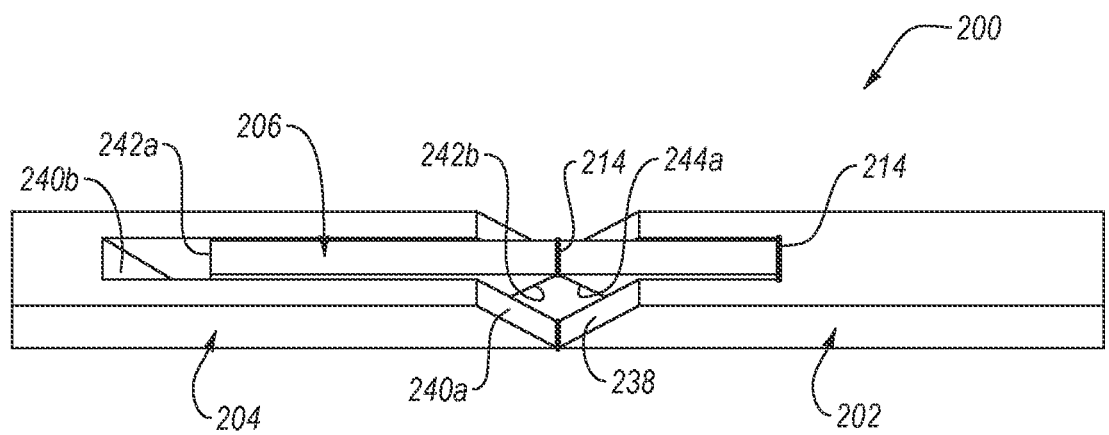
FIGS. 2A and 2B are isometric views of a deployable structure in the folded and deployed states thereof, respectively, according to an embodiment.

FIG. 1 is a schematic of a deployable structure 100 in the deployed state thereof, according to an embodiment. The deployable structure 100 is an example of a planar deployable structure 100. The deployable structure 100 includes four members. For example, as illustrated, the members of the deployable structure 100 includes a base member 102, a first articulable member 104, a second articulable member 106, and an interference member 108. The members of the deployable structure 100 may be articulably connected together using one or more hinges, such as using a first hinge 110, a second hinge 112, a third hinge 114, and a fourth hinge 116. In particular, the base member 102 may be articulably connected to the first articulable member 104 using a first hinge 110, the first articulable member 104 may be articulably connected to the second articulable member 106 using a second hinge 112, the second articulable member 106 may be articulably connected to the interference member 108 via a third hinge 114, and the interference member 108 may be articulably connected to the base member 102 using a fourth hinge 116. For illustrative purposes, the hinges disclosed herein are illustrated using at least one of a thick dot (as shown in FIG. 1) or using bolded lines (as shown in FIG. 2A).

The members of the deployable structure 100 may be formed from a relatively rigid material. As used herein, the relatively rigid material may include any solid material that has negligible deflection when the deployable structure 100 is in the deployed state and no or some loads are applied to the deployable structure 100. For example, the members of the deployable structure 100 may be at least partially formed from a metal (e.g., aluminum, steel, titanium, etc.), a polymer (e.g., a carbonate, polyethylene, polypropylene, polylactic acid, etc.), a ceramic, a composite, or combinations thereof.

The members of the deployable structure 100 may exhibit any suitable shape. For example, the members of the planar deployable structures disclosed herein are illustrated as exhibiting a generally rectangular prism that may define one or more recesses or cutouts formed therein, as will be discussed in more detail below. However, it is noted that one or more of the members of the deployable structure 100 may exhibit other shapes, such as generally oblong shapes (e.g., a shape exhibiting a generally oval cross-section, such as an ovoid), generally triangular shapes (e.g., generally triangular prism), arcuate or annular shapes, or any other suitable shape.

The members of the deployable structure 100 each exhibit a length. The base member 102 exhibits a first length $L_1$ measured between the first hinge 110 and the fourth hinge 116 in a direction that is parallel to a longitudinal axis of the base member 102. The first articulable member 104 exhibits a second length $L_2$ measured between the first hinge 110 and the second hinge 112 in a direction that is parallel to a longitudinal axis of the first articulable member 104. The second articulable member 106 exhibits a third length $L_3$ measured between the second hinge 112 and the third hinge 114 in a direction that is parallel to a longitudinal axis of the second articulable member 106. The interference member 108 exhibits a fourth length $L_4$ measured between the third hinge 114 and the fourth hinge 116 in a direction that is parallel to a longitudinal axis of the interference member 108. The first length $L_1$, the second length $L_2$, the third length $L_3$, and the fourth length $L_4$ may be selected such that $L_1+L_2=L_3+L_4$ otherwise the deployable structure 100 may not exhibit a compact arrangement when the deployable structure 100 is in the folded state.

The first length $L_1$, the second length $L_2$, the third length $L_3$, and the fourth length $L_4$ may be independently selected to be about 1 cm or greater, about 2.5 cm or greater, about 5 cm or greater, about 10 cm or greater, about 15 cm or greater, about 20 cm or greater, about 25 cm or greater, about 30 cm or greater, about 40 cm or greater, about 50 cm or greater, about 60 cm or greater, about 75 cm or greater, about 1 m or greater, about 1.25 m or greater, about 1.5 m or greater, about 2 m or greater, about 2.5 m or greater, about 3 m or greater, about 5 m or greater, about 5 m or greater, about 10 m or greater, about 15 m or greater, about 20 m or greater, about 25 m or greater, or in ranges of about 1 cm to about 5 cm, about 2.5 cm to about 10 cm, about 5 cm to about 15 cm, about 10 cm to about 20 cm, about 15 cm to about 25 cm, about 20 cm to about 30 cm, about 25 cm to about 35 cm, about 30 cm to about 40 cm, about 30 cm to about 50 cm, about 40 cm to about 60 cm, about 50 cm to about 75 cm, about 60 cm to about 1 m, about 75 cm to about 1.25 m, 1 m to about 1.5 cm, about 1.25 cm to about 1.75 m, about 1.5 m to about 2 m, about 1.75 m to about 2.5 m, about 2 m to about 3 m, about 2.5 m to about 4 m, about 3 m to about 5 m, about 3 m to about 6 m, about 5 m to about 7.5 m, about 6 m to about 10 m, about 7.5 m to about 15 m, about 10 m to about 20 m, or about 15 m to about 25 m. The first length $L_1$, the second length $L_2$, the third length $L_3$, and the fourth length $L_4$ may be selected based on the desired size of the deployable structure 100 when the deployable structure 100 is in the deployed and/or folded state. The first length $L_1$, the second length $L_2$, the third length $L_3$, and the fourth length $L_4$ may also be selected based on the application of the deployable structure 100. For example, the first length $L_1$, the second length $L_2$, the third length $L_3$, and the fourth length $L_4$ may be selected to be in the centimeter range when the deployable structure 100 is used as hinge between the table top and legs of a table and in the meter range when the deployable structure 100 is used to support solar panels or an antenna array.

The base member 102 exhibits a thickness measured between the top and bottom surfaces 118, 120 and perpendicular to the longitudinal axis of the base member 102. The first articulable member 104 exhibits a thickness measured between the top and bottom surfaces 122, 124 and perpendicular to the longitudinal axis of the first articulable member 104. The second articulable member 106 exhibits a thickness measured between the top and bottom surfaces 126, 128 and perpendicular to the longitudinal axis of the second articulable member 106. The interference member 108 exhibits a thickness measured between the top and bottom surfaces 130, 132 of the interference member 108 and perpendicular to the longitudinal axis of the interference member 108. It is noted that the top surfaces 118, 122, 126, 130 and the bottom surfaces 120, 124, 128, 132 are determined based on which surfaces are above or below each other when the deployable structure 100 is in the folded state. The thicknesses of the base member 102, the first articulable member 104, the second articulable member 106, and the interference member 108 are non-negligible (e.g., greater than 0.5 mm). The non-negligible thicknesses of the members of the deployable structure 100 may be used to self-interfere with each other to maintain the deployable structure 100 in the deployed state and to prevent further movement of the deployable structure 100 away from the folded state. In an example, as will be discussed in more detail below, the non-negligible thickness of the members of the deployable structure 100 allows the hinge ends 137 (e.g., opposing ends of the members spaced longitudinally from each other) to abut each other when the deployable structure 100 is in the deployed state. The non-negligible thickness of the base member 102 and the interference member 108 also allows the interference member 108 to abut the base member 102 when the deployable structure 100 is in the deployed state. The non-negligible thickness of members of the deployable structure 100 also allows the members of the deployable structure 100 to exhibit a rigidity that inhibits bending of thereof which, in turn, allows the deployable structure 100 to exhibit and maintain the deployed state thereof and allows the deployable structure 100 to have loads applied thereto without collapsing.

The thicknesses of the members of the deployable structure 100 may be independently selected to be about 0.5 mm or greater, about 1 mm or greater, about 1.5 mm or greater, about 2 mm or greater, about 3 mm or greater, about 4 mm or greater, about 5 mm or greater, about 7.5 mm or greater, about 1 cm or greater, about 1.5 cm or greater, about 2 cm or greater, about 3 cm or greater, about 4 cm or greater, about 5 cm or greater, about 7.5 cm or greater, about 10 cm or greater, about 20 cm or greater, about 30 cm or greater, about 50 cm or greater, or in ranges of about 0 to about 1 mm, about 0.5 mm to about 1.5 mm, about 1 mm to about 2 mm, about 1.5 mm to about 3 mm, about 2 mm to about 4 mm, about 3 mm to about 5 mm, about 4 mm to about 7.5 mm, about 5 mm to about 1 cm, about 5 mm to about 1.5 cm, about 1 cm to about 2 cm, about 1.5 cm to about 3 cm, about 2 cm to about 4 cm, about 3 cm to about 5 cm, about 4 cm to about 7.5 cm, about 5 cm to about 10 cm, about 7.5 cm to about 20 cm, about 10 cm to about 30 cm, or about 20 cm to about 50 cm. The thicknesses of the members of the deployable structure 100 may be selected based on the size of the deployable structure 100 and the load applied to the deployable structure 100. Also, the thickness of the members of the deployable structure 100 may be selected based on the offsets of the hinges, as discussed in more detail below.

As shown in FIG. 1, there may be overlap between two or more of the members. The two or more members may overlap when at least one of the deployable structure 100 is in the deployed state (as shown), when the deployable structure 100 is in the folded state (as shown in FIG. 2A), or when the deployable structure 100 is another state (e.g., an intermediate state or a flat-fold state). To accommodate these overlaps, one or more of the members of the deployable structure 100 may define one or more recesses or cutouts that are configured to receive at least a portion of another member thereby accommodating any overlap. In an example, the base member 102 may define at least one recess or cutout that is configured to receive at least a portion of the first articulable member 104 and/or at least a portion of the interference member 108. In an example, the first articulable member 104 may define at least one recess or cutout that is configured to receive at least a portion of the base member 102 or the second articulable member 106. In an example, the second articulable member 106 may define at least one recess or cutout that is configured to receive at least a portion of the first articulable member 104 or the interference member 108. In an example, the interference member 108 may define at least one recess or cutout that is configured to receive at least a portion of the base member 102 or the second articulable member 106.

As previously discussed, the deployable structure 100 includes one or more hinges. The hinges may include any suitable hinge. In an example, the hinges may include tape extending between and connecting adjacent members of the deployable structure 100. In an example, the hinges may include fabric or one or more membranes extending between and attached (e.g., adhesively) to adjacent members of the deployable structure 100. In an example, the hinges may include a thin titanium or other metal sheet extending between and connecting adjacent members of the deployable structure 100. In an example, the hinges may include one or more surrogate folds. In an example, the hinges may include a barrel hinge, a mortise hinge, a concealed hinge, a pivot hinge, a self-closing hinge, a living hinge, any other suitable hinge, or combinations thereof.

The first hinge 110 may exhibit a first offset $d_1$ measured between the first hinge 110 and the fourth hinge 116 in a direction that is perpendicular to a longitudinal axis of the base member 102 and a second offset $d_2$ relative to the top surface 122 of the first articulable member 104. The first offset $d_1$ may be 0, equal to the thickness of the base member 102, or some value in between 0 and the thickness of the base member 102. The second offset $d_2$ may be 0, equal to the thickness of the first articulable member 104, or some value in between 0 and the thickness of the first articulable member 104. The second hinge 112 may exhibit a third offset $d_3$ relative to the top surface 122 of the first articulable member 104 and a fourth offset $d_4$ relative to the top surface 126 of the second articulable member 106. The third offset $d_3$ may be 0, equal to the thickness of the first articulable member 104, or some value in between 0 and the thickness of the first articulable member 104. The fourth offset $d_4$ may be 0, equal to the thickness of the second articulable member 106, or some value in between 0 and the thickness of the second articulable member 106. The fourth hinge 116 may exhibit a fifth offset $d_5$ relative to the top surface 126 of the second articulable member 106 and a sixth offset $d_6$ measured between the first hinge 110 and the fourth hinge 116 perpendicularly to a longitudinal axis of the interference member 108. The fifth offset $d_5$ may be 0, equal to the thickness of the second articulable member 106, or some value in between 0 and the thickness of the second articulable member 106. The sixth offset $d_6$ may be 0, equal to a thickness of the interference member 108, or some value in between 0 and the thickness of the interference member 108. The top surfaces 118, 122, 126, 130 and the bottom surfaces 120, 124, 128, 132 may be surfaces that do not intersect with the axes of the hinges when the offsets of the hinges are not equal to zero or equal to a thickness of the relevant member. It is noted that the offsets disclosed herein are measured from an axis of rotation of the hinge.

The first offset $d_1$, the second offset $d_2$, the third offset $d_3$, the fourth offset $d_4$, the fifth offset $d_5$, and the sixth offset $d_6$ may be independently selected to be 0, about 0.5 mm or greater, about 1 mm or greater, about 1.5 mm or greater, about 2 mm or greater, about 3 mm or greater, about 4 mm or greater, about 5 mm or greater, about 7.5 mm or greater, about 1 cm or greater, about 1.5 cm or greater, about 2 cm or greater, about 3 cm or greater, about 4 cm or greater, about 5 cm or greater, about 7.5 cm or greater, about 10 cm or greater, about 20 cm or greater, about 30 cm or greater, about 50 cm or greater, or in ranges of about 0 to about 1 mm, about 0.5 mm to about 1.5 mm, about 1 mm to about 2 mm, about 1.5 mm to about 3 mm, about 2 mm to about 4 mm, about 3 mm to about 5 mm, about 4 mm to about 7.5 mm, about 5 mm to about 1 cm, about 5 mm to about 1.5 cm, about 1 cm to about 2 cm, about 1.5 cm to about 3 cm, about 2 cm to about 4 cm, about 3 cm to about 5 cm, about 4 cm to about 7.5 cm, about 5 cm to about 10 cm, about 7.5 cm to about 20 cm, about 10 cm to about 30 cm, or about 20 cm to about 50 cm. The first offset $d_1$, the second offset $d_2$, the third offset $d_3$, the fourth offset $d_4$, the fifth offset $d_5$, and the sixth offset $d_6$ may be selected based on the size of the deployable structure 100 when the deployable structure 100 is in the deployed state and how compactly the deployable structure 100 is when in the folded state.

Figure 2B:
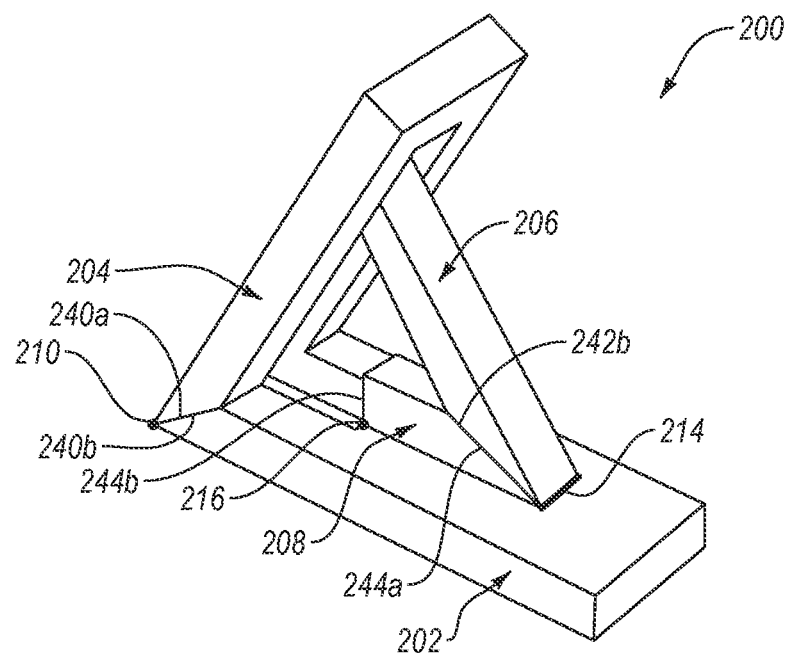

In an example, the first offset $d_1$, the second offset $d_2$, the third offset $d_3$, the fourth offset $d_4$, the fifth offset $d_5$, and the sixth offset $d_6$ may also be selected such that at least some (e.g., substantially all) of the loads applied to the deployable structure 100 when the deployable structure 100 is in the deployed state is carried through the base member 102, the first articulable member 104, the second articulable member 106, and the interference member 108 instead of the hinges. In such an example, the hinge ends 137 of two or more of the base member 102, the first articulable member 104, the second articulable member 106, and the interference member 108 contact each other (as shown in FIG. 2B). In other words, the thicknesses of the base member 102, the first articulable member 104, the second articulable member 106, and the interference member 108 are used to create surface contact therebetween which causes loads applied to the deployable structure 100 to be at least partially directly transferred to the members thereof instead of through the hinges since the hinges may be more likely to fail than the members.

The deployable structure 100 may exhibit a dihedral angle $\rho_d$ and an angle $\theta$ when the deployable structure 100 is in the deployed state. The dihedral angle $\rho_d$ is the smallest angle measured between the base member 102 and the first articulable member 104 (e.g., between the top surface 118 and the top surface 122) when the deployable structure 100 is in the deployed state. The angle $\theta$ is the maximum angle measured between the base member 102 and second articulable member (e.g., the top surface 118 and the top surface 126) when the deployable structure 100 is in the deployed state. The dihedral angle $\rho_d$ and the angle $\theta$ depends on the first length $L_1$, the second length $L_2$, the third length $L_3$, the fourth length $L_4$, the first offset $d_1$, the second offset $d_2$, the third offset $d_3$, the fourth offset $d_4$, the fifth offset $d_5$, and the sixth offset $d_6$ according to the equation:

$$L_1 + d_1 i + d_2 i e^{i\rho_d} - L_2 e^{i\rho_d} - d_3 i e^{i\rho_d} + d_4 i e^{i\theta} + L_3 e^{i\theta} - d_5 i e^{i\theta} + d_6 i + L_4 = 0$$

Thus, the first length $L_1$, the second length $L_2$, the third length $L_3$, the fourth length $L_4$, the first offset $d_1$, the second offset $d_2$, the third offset $d_3$, the fourth offset $d_4$, the fifth offset $d_5$, and the sixth offset $d_6$ may be selected based on the desired dihedral angle $\rho_d$ and the desired second angle $\theta$, and vice versa.

As previously discussed, the deployable structure 100 is configured to switch between the deployed state (illustrated) and the folded state (see FIG. 2A). In an example, the deployable structure 100 may be configured to exhibit a more compact state (e.g., occupy a smaller volume) when the deployable structure 100 is in the folded state than when in the deployed state. In an example, the deployable structure 100 may exhibit a significantly smaller thickness (measured parallel to a thickness of the base member 102) when in the folded state than when in the deployed state. In an example, the deployable structure 100 may exhibit a larger length (measured parallel to the first length $L_1$) when in the folded state than when in the deployed state. In an example, the deployable structure 100 may exhibit a generally flat (e.g., planar) shape when in the folded state.

The deployable structure 100 may switch between the folded and deployed states responsive to movement of the first articulable member 104, the second articulable member 106, and the interference member 108. For example, rotating the base member 102, the first articulable member 104, the second articulable member 106, and the interference member 108 about their respective hinges causes the deployable structure 100 to switch between the deployed state and the folded state. The deployable structure 100 may have only a single degree of freedom.

In the particular illustrated embodiment, the deployable structure 100 switches from the folded state to the deployed state when at least one of the first articulable member 104 is rotated about the first hinge 110 to decrease the inner angle between the base member 102 and the first articulable member 104, the second articulable member 106 is rotated about the second hinge 112 to increase the inner angle between the first and second articulable member 104, 106, the interference member 108 is rotated about the third hinge 114 such that the inner angle between the second articulable member 106 and the interference member 108 decreases, or the interference member 108 is rotated about the fourth hinge 116 until the top surface 130 of the interference member 108 contacts the base member 102. It is noted that the inner angles refers to the minimum angle between the members when the deployable structure 100 is in the deployed state. The deployable structure 100 switches from the deployed state to the folded state by reversing the above process. For example, the deployable structure 100 switches from the deployed state to the folded state when at least one of the first articulable member 104 is rotated about the first hinge 110 to increase the inner angle between the base member 102 and the first articulable member 104, the second articulable member 106 is rotated about the second hinge 112 to decrease the inner angle between the first and second articulable member 104, 106, the interference member 108 is rotated about the third hinge 114 such that the inner angle between the second articulable member 106 and the interference member 108 increases, or the interference member 108 is rotated about the fourth hinge 116 such that the top surface 130 of the interference member 108 no longer contacts the base member 102.

As discussed above, the interference member 108 may be configured to abut the base member 102 when the deployable structure 100 is in the deployed state. In particular, causing the interference member 108 to contact the base member 102 prevents further rotation of the interference member 108 relative to the base member 102 which, in turn, prevents further rotation of the first articulable member 104 and the second articulable member 106. The prevention of further rotation of the first articulable member 104, the second articulable member 106, and the interference member 108 causes the deployable structure 100 to exhibit a relatively rigid and stable deployed state.

In an embodiment, the interference member 108 is configured to rotate about 180° about the fourth hinge 116 when switching the deployable structure 100 between the folded and deployed states. The interference member 108 may rotate about 180°, for example, when the hinges are located on one or two planes that are parallel to the top surfaces or bottom surfaces of the members when the deployable structure 100 is in the folded state. Rotating the interference member 108 about 180° may increase the stability of the deployable structure. In an embodiment, the interference member 108 is configured to rotate about 175° or less or about 185° or more about the fourth hinge 116.

The deployable structure 100 may exhibit one or more intermediate states between the folded state and the deployed state. Generally, the deployable structure 100 may be unable to maintain the intermediate states, thereof, no load or a relatively small load is applied to the deployable structure. For example, the deployable structure 100 may move from the intermediate state to the folded or deployed state when no load or a relatively small load is applied to the intermediate states. It is noted that the deployable structure 100 may be configured to maintain the intermediate state. In an example, the deployable structure 100 may include a brace, a spring, or other mechanical device that is configured to maintain the deployable structure 100 in an intermediate state. In an example, one or more of the hinges of the deployable structure 100 may have some inherent stiffness that maintains the deployable structure 100 in the intermediate state.

FIGS. 2A and 2B are isometric views of a deployable structure 200 in the folded and deployed states thereof, respectively, according to an embodiment. Except as otherwise disclosed herein, the deployable structure 200 is the same as or substantially similar to any of the deployable structures disclosed herein. For example, the deployable structure 200 includes a base member 202, a first articulable member 204, a second articulable member 206, and an interference member 208. The base member 202 is connected to the first articulable member 204 via a first hinge 210, the first articulable member is connected to the second articulable member 206 via a second hinge (not shown, obscured), the second articulable member 206 is connected to the interference member 208 via a third hinge 214, and the interference member 208 is connected to the base member 202 via a fourth hinge 216.

In an embodiment, as illustrated, the base member 202 may define a first recess 234 and the first articulable member 204 may define a second recess 236. The first recess 234 is configured to have at least a portion (e.g., substantially all) of the interference member 208 disposed therein and the second recess 236 is configured to have at least a portion (e.g., substantially all) of the second articulable member 206 disposed therein when the deployable structure 200 is in the folded state. As such, the first and second recesses 234, 236 allows the deployable structure 200 to exhibit a compact configuration when in the folded state.

Each of the members of the deployable structure 200 includes hinge ends. Hinge ends are surfaces of the members that are adjacent to the hinges. The hinge ends may extend from the top surface to the bottom surface of their respective member. Each of the hinge ends are also positioned adjacent to a hinge end of an adjacent member. For example, the base member 202 includes a first hinge end 238 and a second hinge end (obscured, under the fourth hinge 216 in FIG. 2A and behind the interference member 208 in FIG. 2B), the first articulable member 204 includes a first hinge end 240a and a second hinge end 242b, the second articulable member 206 includes a first hinge end 242a and a second hinge end 242b, and the interference member 208 includes a first hinge end 244a and a second hinge end 244b.

In an embodiment, one or more of the hinge ends may be tapered. That is, one or more of the hinge ends may extend at an oblique angle relative to the top surface and bottom surface of their respective members. In an example, adjacent hinge ends (e.g., the hinge end 238 of the base member 202 and hinge end 240a of the first articulable member 204) may be tapered such that the surfaces of the adjacent hinge end abut each other and are parallel to each other when the deployable structure 200 is in the deployed position, as shown in FIG. 2B. In such an example, substantially all of any load that is applied to the deployable structure 200 is transferred directly between the members instead of the hinges since the hinges may be more prone to failure than the members. In an example, the tapered hinge ends may be configured to contact each other simultaneously with the interference member 208 contacting the base member 202. In an example, the tapered hinge ends may be configured to contact each other before the interference member 208 contacts the base member 202. In such an example, the interference member 208 may only contact the base member 202 if the tapered hinge ends fail and, thus, forms a fail-safe. In an example, the tapered hinge ends may only contact each other after the interference member 208 contacts the base member 202 and one of the base member 202 or the interference member 208 fails. In such an example, the tapered hinge ends form a fail-safe. In an embodiment, one or more of the hinge ends may not be tapered (e.g., hinge end 244b).

The deployable structure 200 includes the hinges thereof that are on either a first plane or a second plane when the deployable structure 200 is in the folded state. The first plane may be generally parallel to and intersects a top surface 218 of the base member 202. The second plane may be generally a parallel to and intersects with the bottom surface 220 of the base member 202. For example, as illustrated, the second hinge and the fourth hinges 216 may be disposed on the first plane and the first and third hinges 210, 214 may be disposed on the second plane.

Figure 3A:
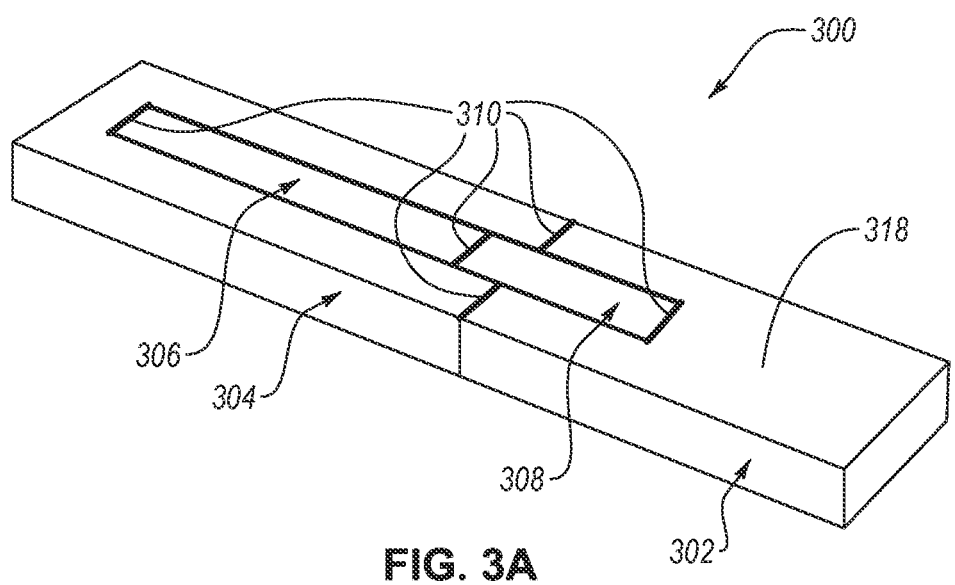
FIGS. 3A and 3B are isometric views of a deployable structure in its folded and deployed states, respectively, according to an embodiment.
Figure 3B:
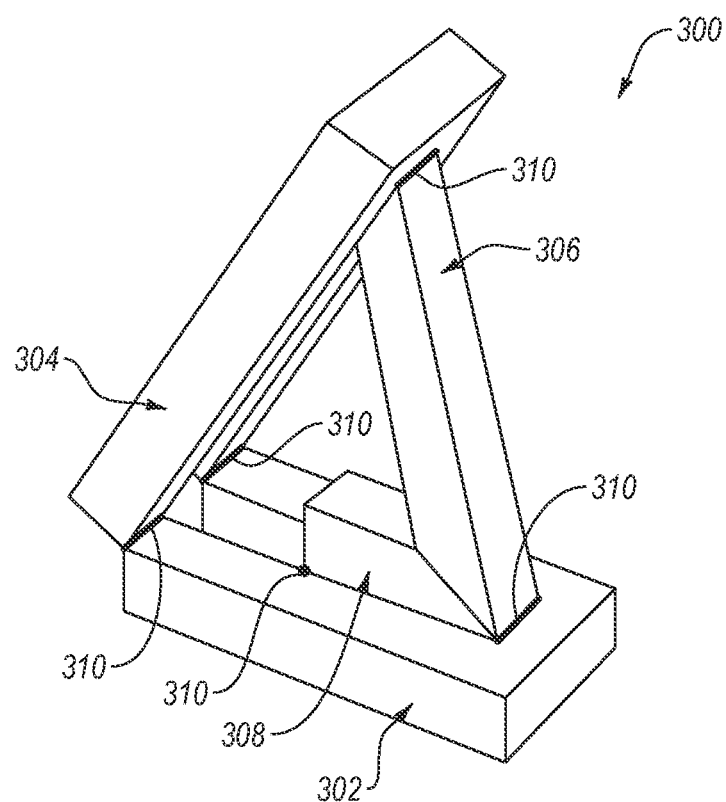

However, it is noted that the hinges of the deployable structures disclosed herein may be on planes other than the first and second planes. For example, FIGS. 3A and 3B are isometric views of a deployable structure 300 in its folded and deployed states, respectively, according to an embodiment. Except as otherwise disclosed herein, the deployable structure 300 is the same as or substantially similar to any of the deployable structures disclosed herein. The deployable structure 300 includes a base member 302, a first articulable member 304, a second articulable member 306, and an interference member 308. These members of the deployable structure 300 are articulably connected together using hinges 310. The hinges 310 are all disposed on the same plane. For example, the hinges 310 are disposed on a plane that is parallel to and intersects the top surface 318 of the base member 302. Disposing the hinges 310 on the same plane and, in particular, on the plane that is parallel to and intersects with the top surface 318, simplifies manufacturing of the deployable structure 300. Simplifying manufacturing of the deployable structure 300 may allow for quicker prototyping and/or manufacturing of the deployable structure 300. However, it is noted that disposing the hinges 310 on the same plane may prevent the surfaces of adjacent hinge ends from abutting and being parallel to each other.

Figure 4A:
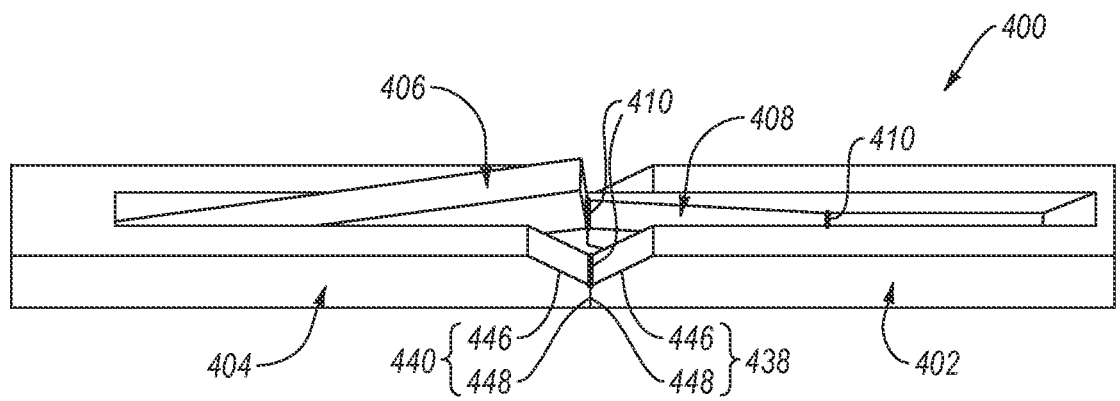
FIGS. 4A and 4B are isometric views of a deployable structure in its folded and deployed states, respectively, according to an embodiment.
Figure 4B:
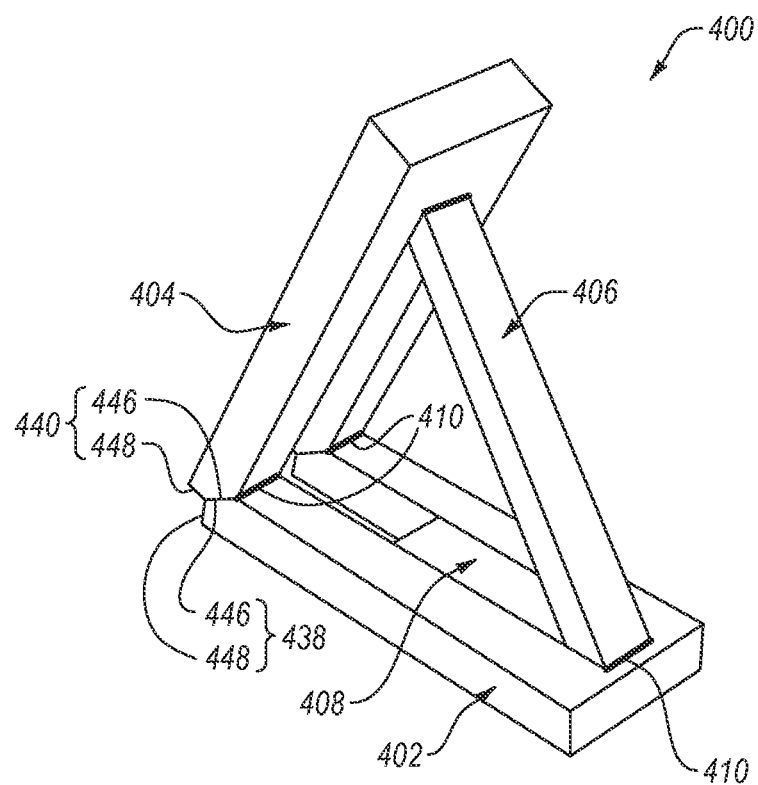

Again, it is noted that the hinges of the deployable structures disclosed herein may be on planes other than the planes illustrated in FIGS. 2A-3B. For example, FIGS. 4A and 4B are isometric views of a deployable structure 400 in its folded and deployed states, respectively, according to an embodiment. Except as otherwise disclosed herein, the deployable structure 400 is the same as or substantially similar to any of the deployable structures disclosed herein. The deployable structure 400 includes a base member 402, a first articulable member 404, a second articulable member 406, and an interference member 408. These members of the deployable structure 400 are articulably connected together using hinges 410. The offset of each of the hinges 410 are different such that the hinges 410 are not located on a single plane or on two planes. Selecting the offsets to be different may prevent each of the members from lying substantially flat or in as compact of a configuration than if the hinges 410 are located on a single plane or on two planes.

It is noted that each of the hinge end 438 of the base member 402 and the hinge end 440 of the first articulable member 404 includes a tapered surface 446 and an additional surface 448. The tapered surfaces 446 of the hinge ends 438, 440 are configured to abut and be substantially parallel to each other when the deployable structure 400 is in the deployed state. As such, the tapered surface 446 causes more of a load applied to the deployable structure 400 to be transferred directly between the base member 402 and the first articulable member 404. However, the hinges ends 438, 440 must include the additional surface 448 in addition to the tapered surface 446 since the hinge 410 between the base member 402 and the first articulable member 404 is not adjacent to the top or bottom surfaces of the respective member. As such, the hinge ends 438, 440 include the additional surface 448 extending from the tapered surface 446. The additional surface 448 extends at an angle that is more perpendicular to the top or bottom surfaces of the respective member to prevent the additional surface 448 form inhibiting rotation about the hinges 410. It is noted that any of the hinge ends disclosed herein may include a tapered surface and an additional surface.

Figure 5A:
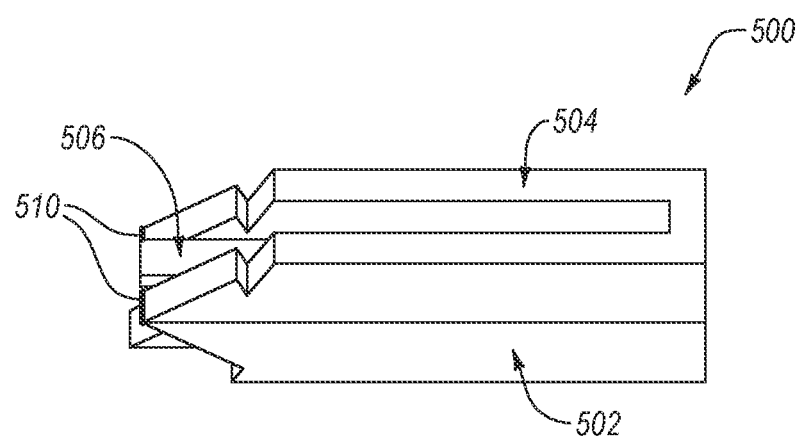
FIGS. 5A-5C are isometric views of a deployable structure exhibiting a flat-folded state, a folded state, and a deployed state, respectively, according to an embodiment.
Figure 5B:
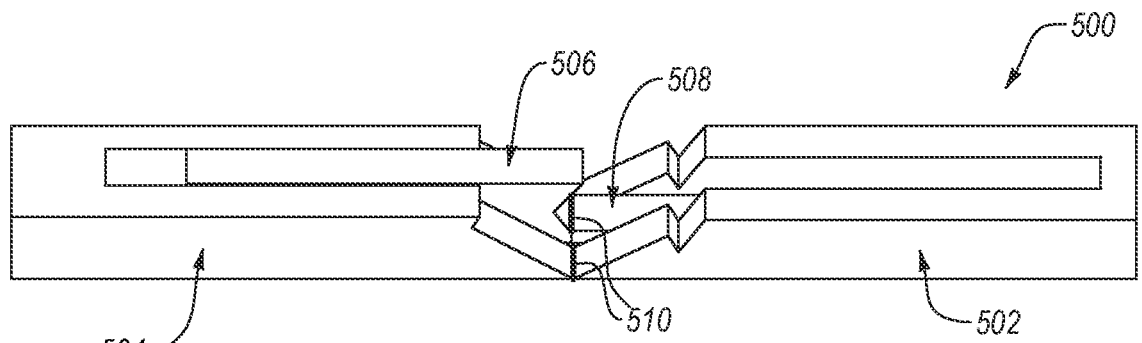
Figure 5C:
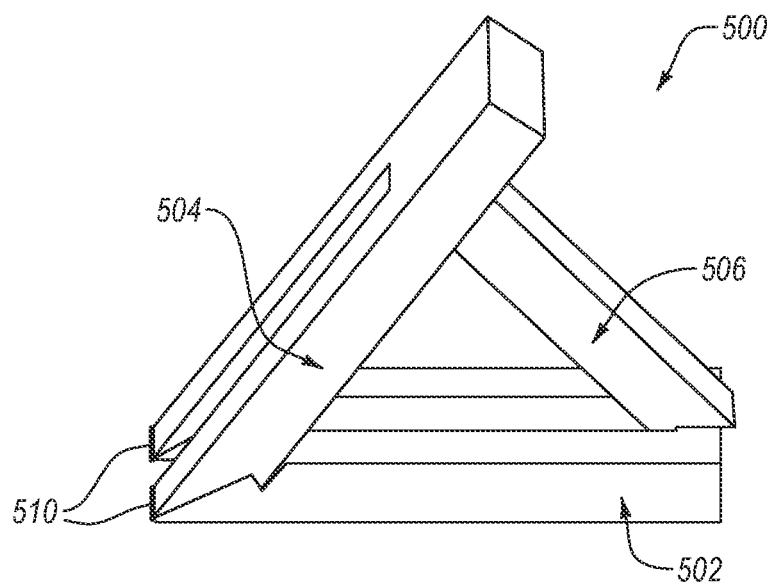

The deployable structures disclosed herein may exhibit a state other than the folded, deployed, and intermediate states discussed above. For example, FIGS. 5A-5C are isometric views of a deployable structure 500 exhibiting a flat-folded state, a folded state, and a deployed state, respectively, according to an embodiment. Except as otherwise disclosed herein, the deployable structure 500 is the same as or substantially similar to any of the deployable structures disclosed herein. The deployable structure 500 includes a base member 502, a first articulable member 504, a second articulable member 506, and an interference member (not shown, obscured within base member 502). These members of the deployable structure 500 are articulably connected together using hinges 510.

The deployable structure 500 includes a flat-folded state (FIG. 5A), a folded state (FIG. 5B), and a deployed state (FIG. 5C). The deployable structure 500 may switch between the flat-folded state and the folded state, and may switch between the folded state and the deployed state. In other words, the folded state is a state between the flat-folded state and the deployed state. It is noted that the deployable structure 500 may exhibit the flat-folded state when at least one of the members of the deployable structure 500 may rotate about 360° about a hinge 510.

Generally, switching the deployable structure 500 from the folded state to the flat-folded state increases the overall thickness and decreases the overall length of the deployable structure 500. Also, switching the deployable structure 500 from the folded state to the flat-folded state may not significantly affect the compactness of the deployable structure. Allowing the deployable structure 500 to switch between the folded state and the flat-folded state may facilitate storage and handling of the deployable structure 500. For example, the deployable structure 500 may, in some instances, be easier to store or handle when exhibiting the flat-folded state than when exhibiting the folded state, and vice versa.

The deployable structure 500 may exhibit the flat-folded state when the hinges 510 are collinear which allows at least one of the members of the deployable structure 500 to rotate about 360° about a hinge 510. In the illustrated embodiment, the hinges 510 of the deployable structure 500 are collinear because the length $L_1$ of the base member 502 is equal to the length $L_4$ of the interference member 508 and the length $L_2$ of the first articulable member 504 is equal to the length $L_3$ of the second articulable member 506 (the lengths $L_1$, $L_2$, $L_3$, and $L_4$ are shown in FIG. 1).

It is noted that the deployable structures illustrated in FIGS. 1-5C consist of a single base member, a single first articulable member, a single second articulable member, and a single interference member. The four members of the deployable structures illustrated in FIGS. 1-5C causes the deployable structures to exhibit a single degree of freedom which may make operating (e.g., switching between at least the compact and deployed states thereof) easier and quicker. However, in an embodiment, the deployable structures disclosed herein may include at least one of a plurality of base members, a plurality of first articulable members, a plurality of second articulable members, or a plurality of interference members. In such an embodiment, the additional members may cause the deployable structures disclosed herein to exhibit two or more degrees of freedom. The two or more degrees of freedom may cause such deployable structures to include two or more distinct deployed states. The two or more distinct deployed states may be desirable or undesirable, depending on the application of the deployable structures.

Figure 6A:
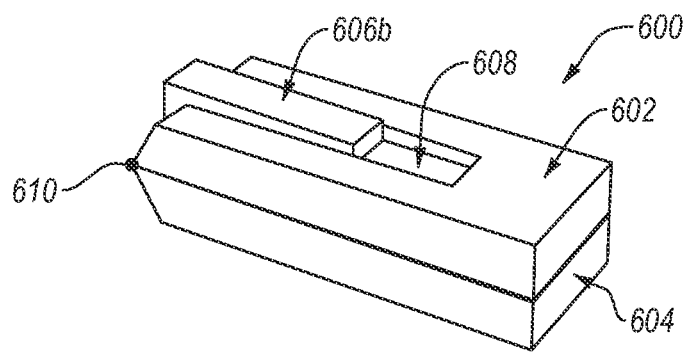
FIGS. 6A-6C are isometric views of a deployable structure in a flat-folded state, a folded state, a first deployed state, and a second deployed state, respectively, according to an embodiment.
Figure 6B:
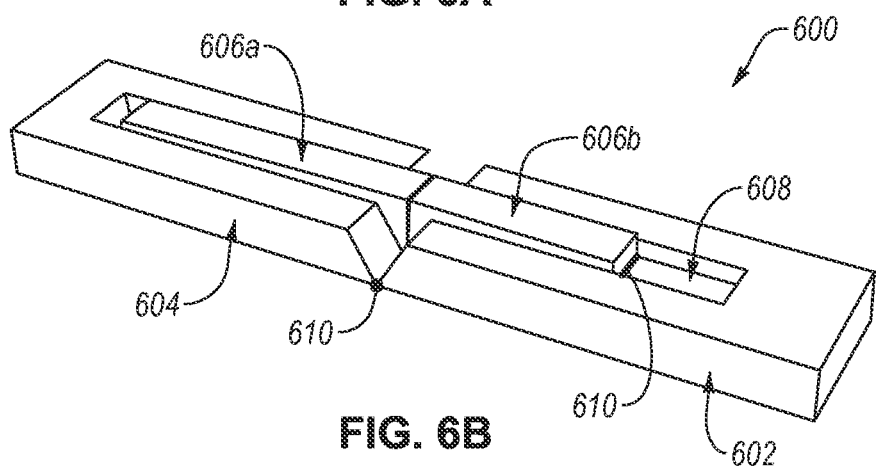
Figure 6C:
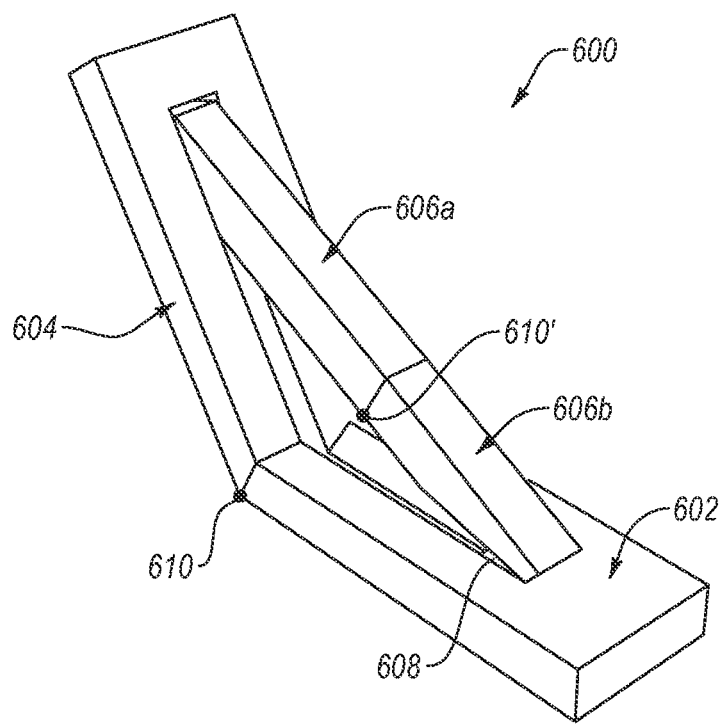

An example of a deployable structure that includes a plurality of one member (i.e., a plurality of second articulable members) is illustrated in FIGS. 6A-6C. FIGS. 6A-6C are isometric views of a deployable structure 600 in a flat-folded state, a folded state, and a first deployed state, respectively, according to an embodiment. Except as otherwise disclosed herein, the deployable structure 600 is the same as or substantially similar to any of the deployable structures disclosed herein. The deployable structure 600 includes a base member 602, a first articulable member 604, and an interference member 608. These members of the deployable structure 600 are articulably connected together using hinges 610.

The deployable structure 600 includes a plurality second articulable members, such as initial second articulable member 606a and an additional second articulable member 606b. The initial second articulable member 606a is articulably connected to the first articulable member 604 and the additional second articulable member 606b is articulably connected to the interference member 608 using the hinges 610. The initial second articulable member 606a and the additional second articulable member 606b are articulably connected together using an additional hinge 610'.

The initial and additional second articulable member 606b allows the deployable structure 600 to exhibit the flat-folded state even when the collective length of the second articulable member is greater than the length of the first articulable member 604. For example, the additional hinge 610' may be positioned to be collinear with some of the other hinges such that the deployable member 600 may exhibit the flat-folded state.

As previously discussed, presence of a plurality of secondary articulating members causes the deployable structure 600 to exhibit two or more degrees of freedom which, in turn, causes the deployable structure 600 to exhibit a plurality of deployed states. For example, the initial second articulable member 606a and the additional second articulable member 606b causes the deployable structure 600 to exhibit the first deployed state (FIG. 6C) and the second deployed state (not shown). The presence of the plurality of deployed states may be advantageous when it is desirable to have a plurality of deployed states even though the plurality of deployed state may make switching the deployable structure 600 into a specific one of the deployed states difficult. However, the presence of the plurality of deployed states may be disadvantageous when only one deployed state is desired.

Figure 7:
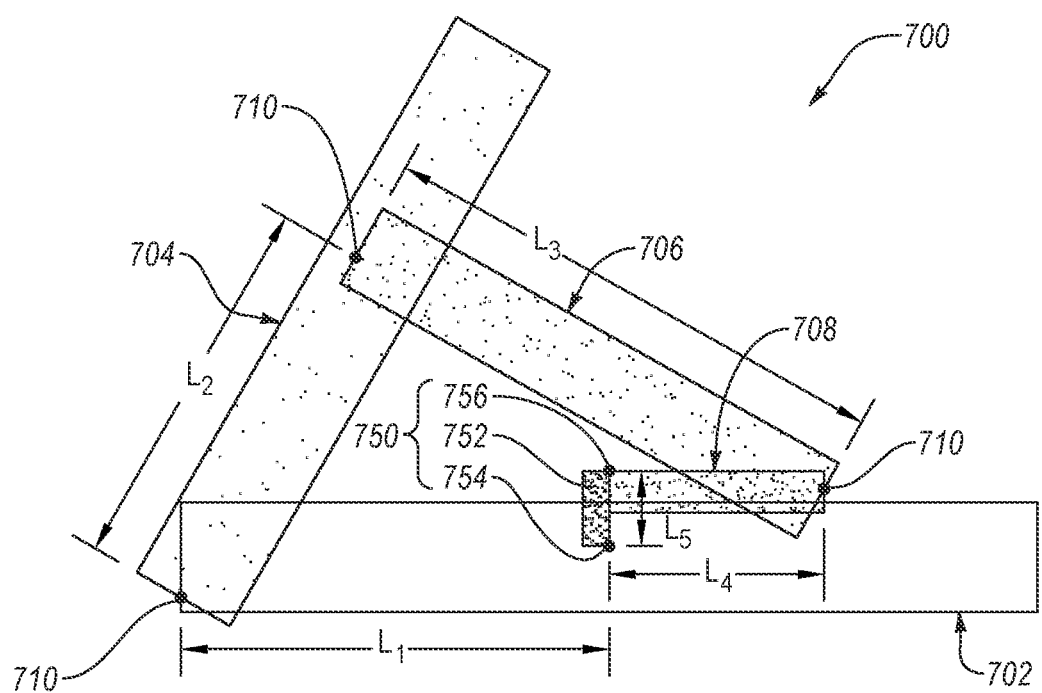
FIG. 7 is a schematic of a deployable structure that includes a crease joint, according to an embodiment.

In an embodiment, the hinge connecting the base member to the interference member (i.e., the fourth hinge) in any of the deployable structures disclosed herein may include a crease joint. FIG. 7 is a schematic of a deployable structure 700 that includes a crease joint 750, according to an embodiment. Except as otherwise disclosed herein, the deployable structure 700 is the same as or substantially similar to any of the deployable structures disclosed herein. The deployable structure 700 includes a base member 702, a first articulable member 704, a second articulable member 706, and an interference member 708. With the exception of the connection between the base member 702 and the interference member 708, these members of the deployable structure 700 are articulably connected together using hinges 710.

The base member 702 and the interference member 708 are articulable connected together using a crease joint 750. In other words, the hinge that articulably connects the base member 702 to the interference member (e.g., the fourth hinges disclosed herein) is a crease joint 750. The crease joint 750 may facilitate rotation of the interference member 708 about the base member 702 when, without the crease joint 750, such rotation would be limited (e.g., less than about 180°) or impossible. The crease joint 750 includes a beam 752. The beam 752 is connected to the base member 702 using a first crease joint hinge 754 and to the interference member 708 using a second crease joint hinge 756. The beam 752 exhibits a length $L_5$ measured between the first and second crease joint hinges 754, 756. The length $L_5$ is selected such that the sum of the first length $L_1$ of the base member 702 and the second length $L_2$ of the first articulable member 704 is equal to the sum of the third length $L_3$ of the second articulable member 506, the fourth length $L_4$ of the interference member 508, and the length $L_5$ of the beam 752 (i.e., $L_1+L_2=L_3+L_4+L_5$).

Figure 8:
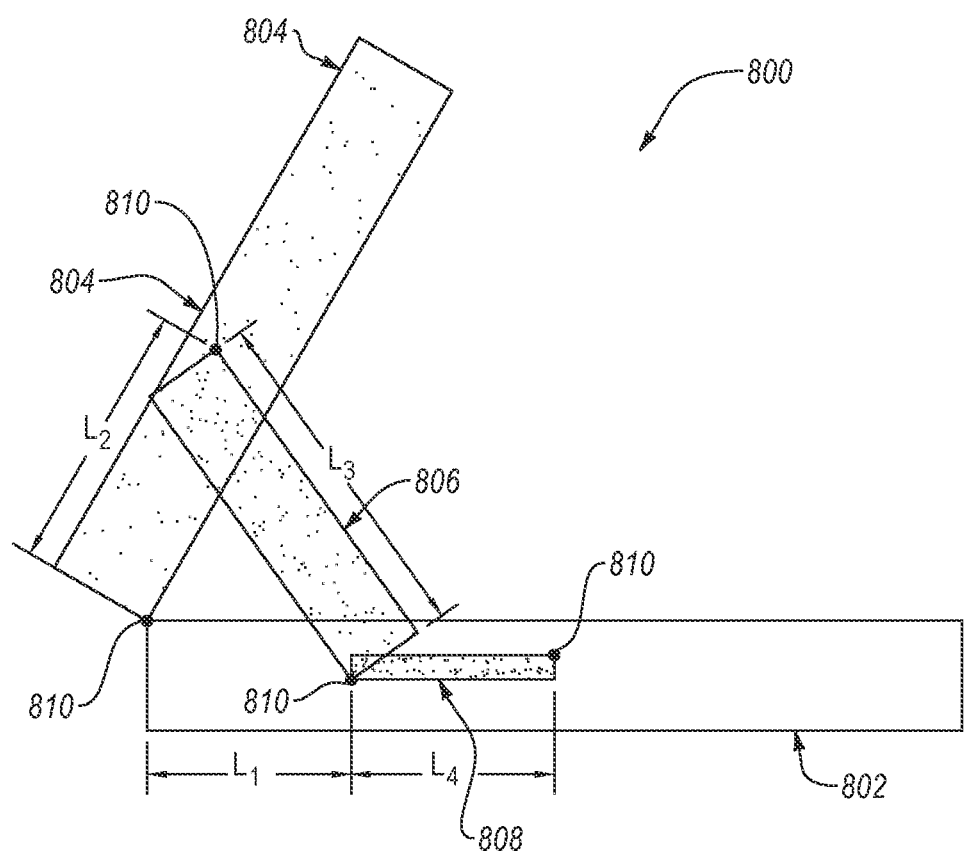
FIG. 8 is a schematic of a deployable structure, according to an embodiment.

The deployable structures illustrated in FIGS. 1-7 are configured to switch from the folded state to the deployed state. However, it is noted that the deployable structures disclosed herein may be "inverted" such that the deployable structures are able to switch directly from the flat-folded state to the deployed state. For example, FIG. 8 is a schematic of a deployable structure 800, according to an embodiment. Except as otherwise disclosed herein, the deployable structure 800 is the same as or substantially similar to any of the deployable structures disclosed herein. For example, the deployable structure 800 includes a base member 802, a first articulable member 804, a second articulable member 806, and an interference member 808. These members of the deployable structure 800 are articulably connected together using hinges 810.

To allow the deployable structure 800 to be "inverted," the lengths of the members of the deployable structure 800 are selected such that the first length $L_1$ of the base member 802 and the fourth length $L_4$ of the interference member 808 are equal to the second length $L_2$ of the first articulable member 804 and the third length $L_3$ of the second articulable member 806 (i.e., $L_1+L_4=L_2+L_3$). Such lengths of the members allows the interference member 808 to rotate towards the first articulable member 804 instead of rotating away from the first articulable member 804. Such rotation of the interference member 808 may allow the deployable structure 800 to switch directly from the flat-folded state to the deployed state.

Figure 9A:
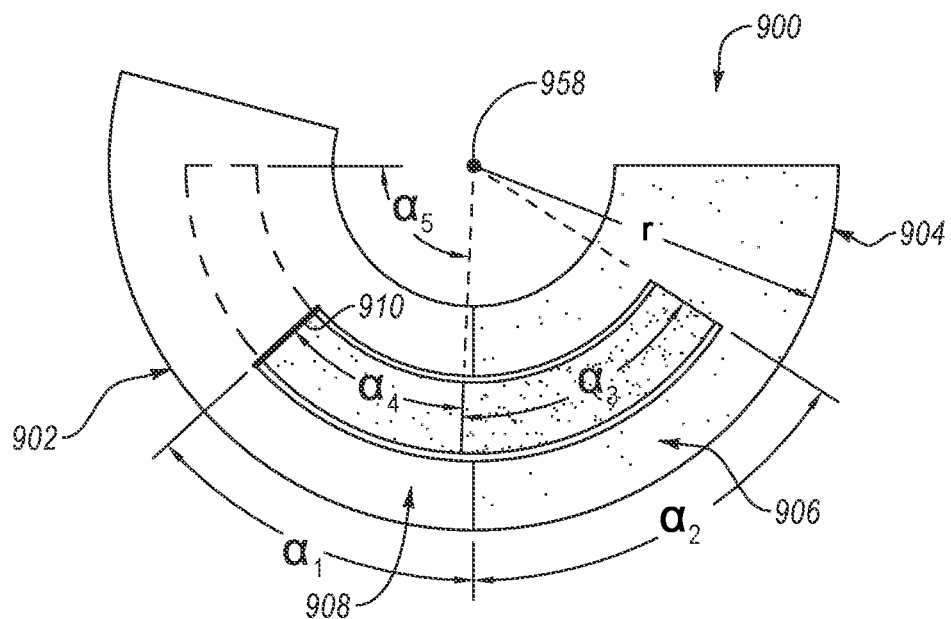
FIGS. 9A and 9B are schematics of a deployable structure in a folded state and a deployed state, respectively, according to an embodiment.
Figure 9B:
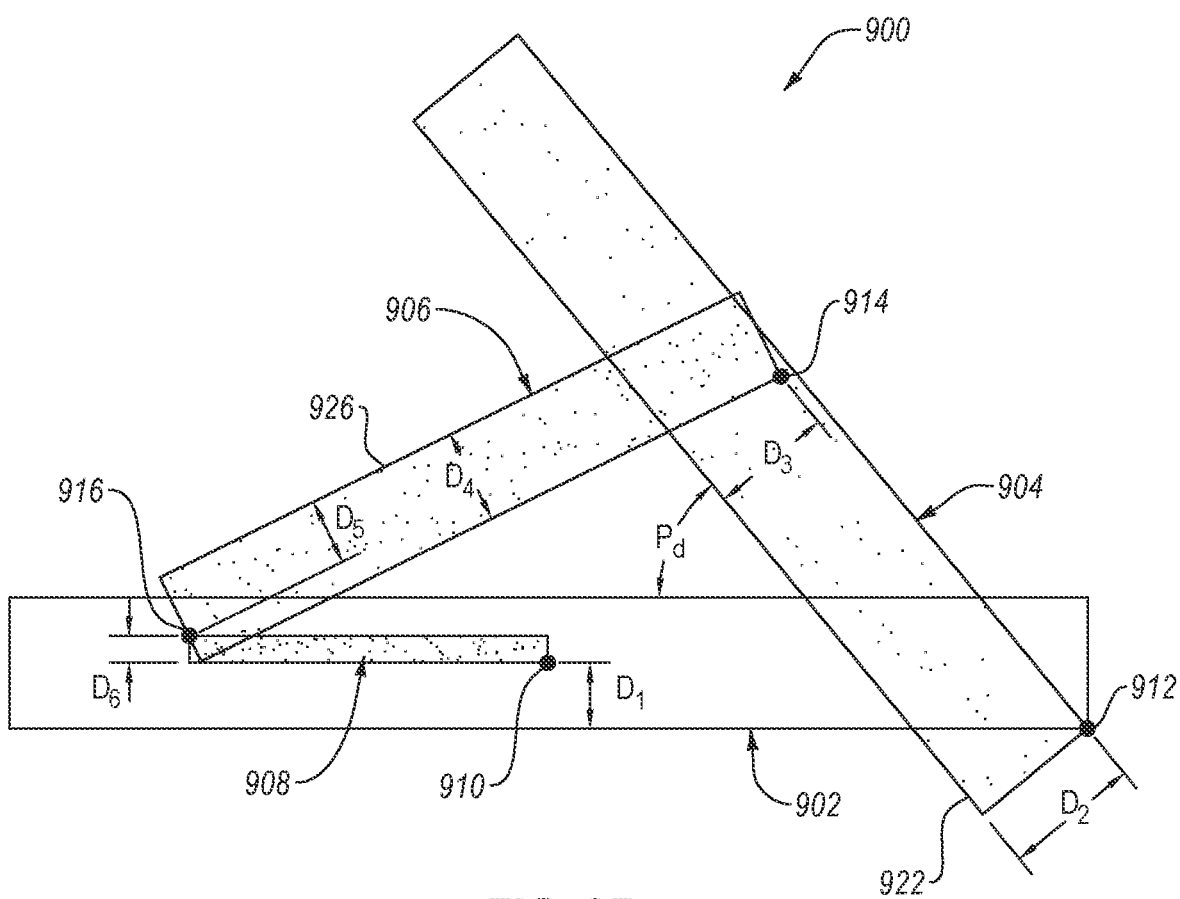

The deployable structures illustrated in FIGS. 1-8 are examples of planar deployable structures. However, the deployable structures disclosed herein may exhibit other types of deployable structures. FIGS. 9A and 9B are schematics of a deployable structure 900 in a folded state and a deployed state, respectively, according to an embodiment. The deployable structure 900 is an example of a spherical deployable structure. Except as otherwise disclosed herein, the deployable structure 900 is the same as or substantially similar to any of the deployable structures disclosed herein. For example, the deployable structure 900 includes a base member 902, a first articulable member 904, a second articulable member 906, and an interference member 908. The members of the deployable structure 900 are articulable connected together via hinges. Similar to the other deployable structures disclosed herein, the deployable structure 900 is configured to switch between folded (i.e., compact) and deployed (e.g., voluminous) states. The deployable structure 900 switches between the folded and deployed states thereof by rotating the members thereof about the hinges, similar to the other deployable structures disclosed herein.

The members of the deployable structure 900 exhibit an arcuate shape (e.g., annular shape). The arcuate shape of the members allows the deployable structure 900 to exhibit a curved shape.

The hinges of the deployable structure 900 may include a first hinge 910, a second hinge 912, a third hinge 914, and a fourth hinge 916. The base member 902 may be articulably connected to the first articulable member 904 using a first hinge 910, the first articulable member 904 may be articulably connected to the second articulable member 906 using a second hinge 912, the second articulable member 906 may be articulably connected to the interference member 908 via a third hinge 914, and the interference member 908 may be articulably connected to the base member 902 using a fourth hinge 916.

The axes of the first, second, third, and fourth hinges 910, 912, 914, 916 may generally intersect at a single point 958 which may allow the members of the deployable structure 900 to articulate about the hinges even though the members exhibit an arcuate shape. The axes of the hinges may need to be angled relative to the top and bottom surfaces of their respective members and/or relative to each other such that the axes of each of the hinges intersect at the single point 958. The base member 902 may exhibit a first angle $\alpha_1$ measured between the axes of the first and fourth hinges 910, 916, the first articulable member 904 exhibits a second angle $\alpha_2$ measured between the axes of the first and second hinges 910, 912, and the second articulable member 906 exhibits a third angle $\alpha_3$ measured between the axes of the second and third hinges 912, 914. The interference member 908 exhibits a fourth angle $\alpha_4$ and a fifth angle as measured between the third and fourth hinges 914, 916 when the deployable structure is in the folded state and deployed state, respectively. The first, second, third, and fourth angles $\alpha_1$, $\alpha_2$, $\alpha_3$, $\alpha_4$ are selected such that $\alpha_1+\alpha_2=\alpha_3+\alpha_4$. The first, fourth, and fifth angles $\alpha_1$, $\alpha_4$, $\alpha_5$ are selected such that $\alpha_5=\alpha_1+\alpha_4$.

Similar to the deployable structure 100 of FIG. 1, the hinges of the deployable structure 900 may exhibit one or more offsets. For example, the first hinge 910 may exhibit a first offset $d_1$ measured between the first hinge 910 and the fourth hinge 916 in a direction that is perpendicular to a longitudinal axis of the base member 902 and a second offset $d_2$ relative to the top surface 922 of the first articulable member 904. The first offset $d_1$ may be 0, equal to a thickness of the base member 902, or some value in between 0 and the thickness of the base member 902. The second offset $d_2$ may be 0, equal to the thickness of the first articulable member 904, or some value in between 0 and the thickness of the first articulable member 904. The second hinge 912 may exhibit a third offset $d_3$ relative to the top surface 922 of the first articulable member 904 and a fourth offset $d_4$ relative to the top surface 926 of the second articulable member 906. The third offset $d_3$ may be 0, equal to the thickness of the first articulable member 904, or some value in between 0 and the thickness of the first articulable member 904. The fourth offset $d_4$ may be 0, equal to the thickness of the second articulable member 906, or some value in between 0 and the thickness of the second articulable member 906. The fourth hinge 916 may exhibit a fifth offset $d_5$ relative to the top surface 926 of the second articulable member 906 and a sixth offset $d_6$ measured between the first hinge 910 and the fourth hinge 916 perpendicularly to a longitudinal axis of the interference member 908. The fifth offset $d_5$ may be 0, equal to the thickness of the second articulable member 906, or some value in between 0 and the thickness of the second articulable member 906. The sixth offset $d_6$ may be 0, equal to a thickness of the interference member 908, or some value in between 0 and the thickness of the interference member 908. The offsets $d_1$, $d_2$, $d_3$, $d_4$, $d_5$, and $d_6$ may independently be selected to exhibit any of the offset values disclosed herein. The offsets $d_1$, $d_2$, $d_3$, $d_4$, $d_5$, and $d_6$ may be selected such that $d_1-d_2+d_3-d_4+d_5-d_6=0$.

The deployable structure 900 may exhibit a dihedral angle $\rho_d$ when the deployable structure 900 is in the deployed state. The dihedral angle $\rho_d$ is the smallest angle measured between the base member 902 and the first articulable member 904 (e.g., between the top surface 918 and the top surface 922) when the deployable structure 900 is in the deployed state. The deployable structure 900 also exhibits an average radius r measured from the single point 958. The dihedral angle $\rho_d$ and the radius r depends on the first angle $\alpha_1$, the second angle $\alpha_2$, the third angle $\alpha_3$, the fourth angle $\alpha_4$, the first offset $d_1$, the second offset $d_2$, the third offset $d_3$, the fourth offset $d_4$, the fifth offset $d_5$, and the sixth offset $d_6$ according to the equations disclosed in David Wayne Andrews, *Incorporating Stability in Deployable Origami-Based Engineering Applications*, BYU ScholarsArchive (2020), the disclosure of which is incorporated herein, in its entirety, by this reference. Thus, the first length $L_1$, the second length $L_2$, the third length $L_3$, the fourth length $L_4$, the first offset $d_1$, the second offset $d_2$, the third offset $d_3$, the fourth offset $d_4$, the fifth offset $d_5$, and the sixth offset $d_6$ may be selected based on the desired dihedral angle $\rho_d$ and the desired radius r, and vice versa.

As previously discussed, the deployable structure 900 is configured to switch between the folded state (FIG. 9A) and the deployed state (FIG. 9B). In an example, the deployable structure 900 may be configured to exhibit a more compact state (e.g., occupy a smaller volume) when the deployable structure 900 is in the folded state than when in the deployed state. In an example, the deployable structure 900 may exhibit a significantly smaller thickness (measured parallel to a thickness of the base member 902) when in the folded state than when in the deployed state. In an example, the deployable structure 900 may exhibit a larger length (measured parallel to the longitudinal axis of the base member 902) when in the folded state than when in the deployed state. In an example, the deployable structure 900 may exhibit a generally flat (e.g., planar) shape when in the folded state.

The deployable structure 900 may switch between the folded and deployed states responsive to movement of the base member 902, the first articulable member 904, the second articulable member 906, and the interference member 908. For example, rotating the base member 902, the first articulable member 904, the second articulable member 906, and the interference member 908 about their respective hinges causes the deployable structure 900 to switch between the deployed state and the folded state. The deployable structure 900 may have only a single degree of freedom (as shown) or, as previously discussed, two or more degrees of freedom.

In the particular illustrated embodiment, the deployable structure 900 switches from the folded state to the deployed state when at least one of the first articulable member 904 is rotated about first hinge 910 to decrease the inner angle between the base member 902 and the first articulable member 904, the second articulable member 906 is rotated about the second hinge 910 to increase the inner angle between the first and second articulable member 904, 906, the interference member 908 is rotated about the third hinge 914 such that the inner angle between the second articulable member 906 and the interference member 908 decreases, or the interference member 908 is rotated about the fourth hinge 916 until the top surface 930 of the interference member 908 contacts the base member 902. It is noted that the inner angles refer to the minimum angle between the members when the deployable structure 900 is in the deployed state. The deployable structure 900 switches from the deployed state to the folded state by reversing the above process.

As discussed above, the interference member 908 may be configured to abut the base member 902 when the deployable structure 900 is in the deployed state. In particular, causing the interference member 908 to contact the base member 902 prevents further rotation of the interference member 908 relative to the base member 902 which, in turn, prevents further rotation of the first articulable member 904 and the second articulable member 906. The prevention of further rotation of the first articulable member 904, the second articulable member 906, and the interference member 908 causes the deployable structure 900 to exhibit a relatively rigid and stable deployed state.

The deployable structure 900 may exhibit one or more intermediate states between the folded state and the deployed state. Generally, the deployable structure 900 may be unable to maintain the intermediate states thereof when no load or a relatively small load is applied to the intermediate states. For example, the deployable structure 900 may move from the intermediate state to the folded or deployed state when no load or a relatively small load is applied to the intermediate states.

Figure 10A:
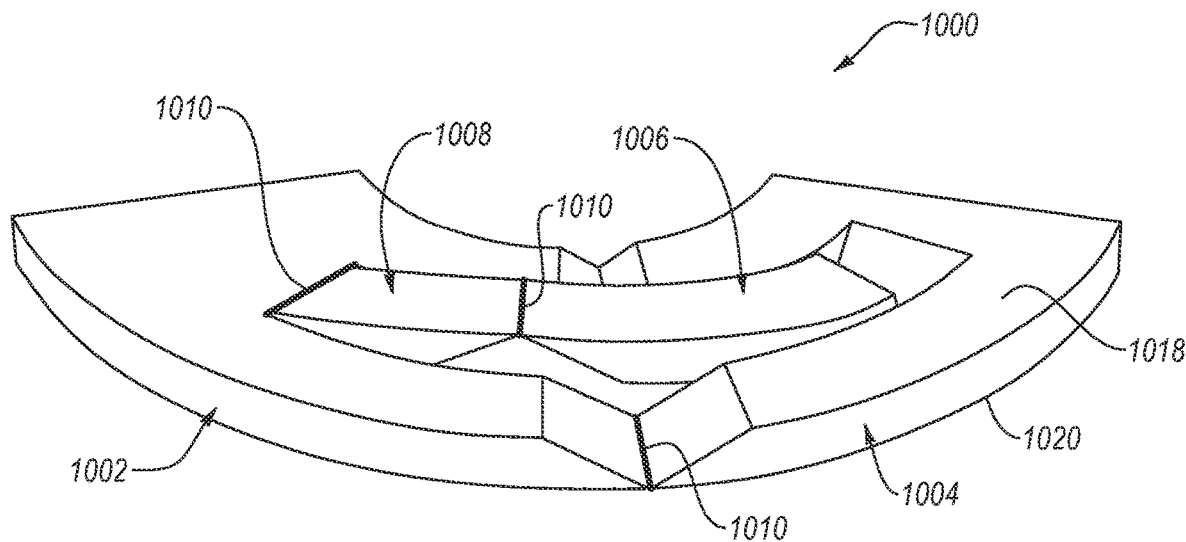
FIGS. 10A and 10B are isometric views of a deployable structure in the folded and deployed states thereof, respectively, according to an embodiment.
Figure 10B:
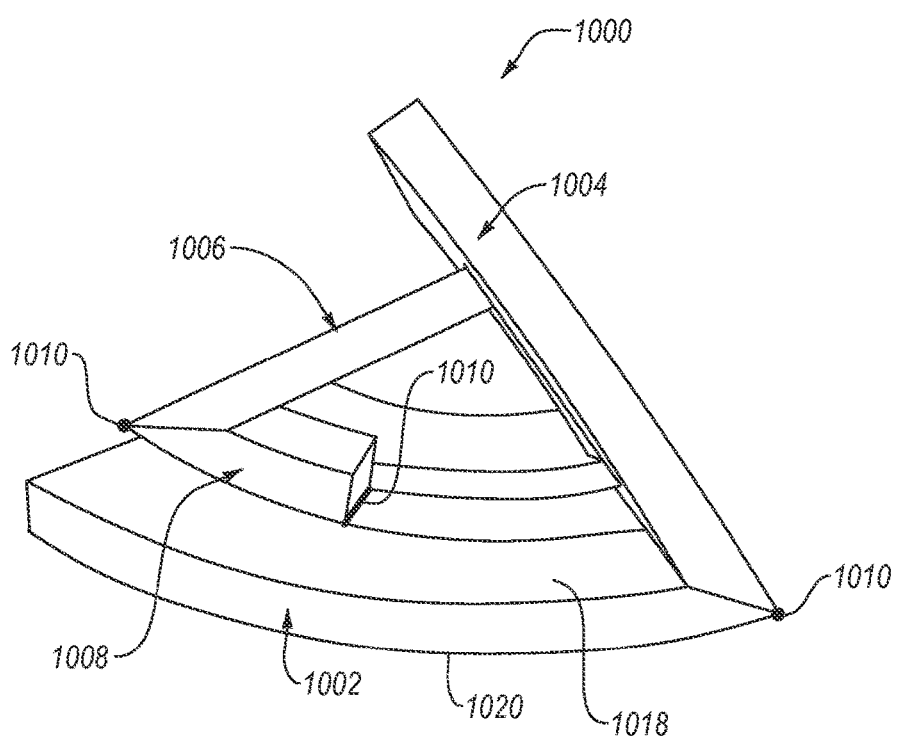

FIGS. 10A and 10B are isometric views of a deployable structure 1000 in the folded and deployed states thereof, respectively, according to an embodiment. Except as otherwise disclosed herein, the deployable structure 1000 is the same as or substantially similar to any of the deployable structures disclosed herein. For example, the deployable structure 1000 includes a base member 1002, a first articulable member 1004, a second articulable member 1006, and an interference member 1008. The base member 1002, the first articulable member 1004, the second articulable member 1006, and the interference member 1008 are articulably connected together using hinges 1010.

In an embodiment, as illustrated, the base member 1002 may define a first recess 1034 and the first articulable member 1004 may define a second recess 1036. The first recess 1034 is configured to have at least a portion of the interference member 1008 disposed therein and the second recess 1036 is configured to have at least a portion of the second articulable member 1006 disposed therein. As such, the first and second recesses 1034, 1036 allows the deployable structure 1000 to exhibit a compact configuration when in the folded state. It is noted that the second articulable member 1006 and/or the interference member 1008 may define recesses or cutouts instead of the base member 1002 and the first articulable member 1004, as previously discussed.

Each of the members of the deployable structure 1000 includes hinge ends. In an embodiment, one or more of the hinge ends may be tapered. In an example, adjacent hinge ends may be tapered such that the surfaces of the adjacent hinge ends abut each other and are parallel to each other when the deployable structure 1000 is in the deployed position, as shown in FIG. 10B. In such an example, substantially all of any load that is applied to the deployable structure 1000 is transferred directly between the members instead of the hinges since the hinges may be more prone to failure than the members. In an embodiment, one or more of the hinge ends may not be tapered.

The deployable structure 1000 includes the hinges thereof that are on either a first plane or a second plane when the deployable structure 1000 is in the folded state. The first plane may be generally parallel to a top surface 1018 of the base member 1002 and the second plane may be generally a parallel to the bottom surface 1020 of the base member 1002. However, it is noted that the hinges of the deployable structures disclosed herein may be on planes other than the first and second planes. For example, as discussed in more detail with regards to FIGS. 3A-4B, the hinges 1010 may be disposed on a single plane or on three or more planes.

Figure 11A:
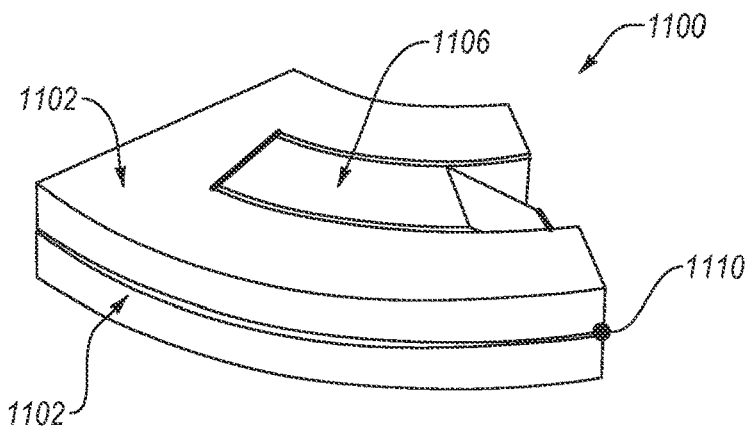
FIGS. 11A-11C are isometric views of a deployable structure exhibiting a flat-folded state, a folded state, and a deployed state, respectively, according to an embodiment.
Figure 11B:
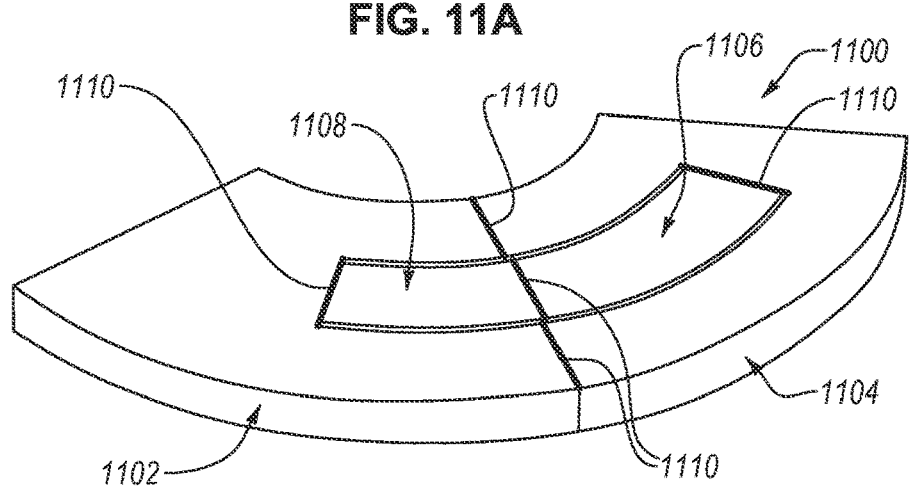
Figure 11C:
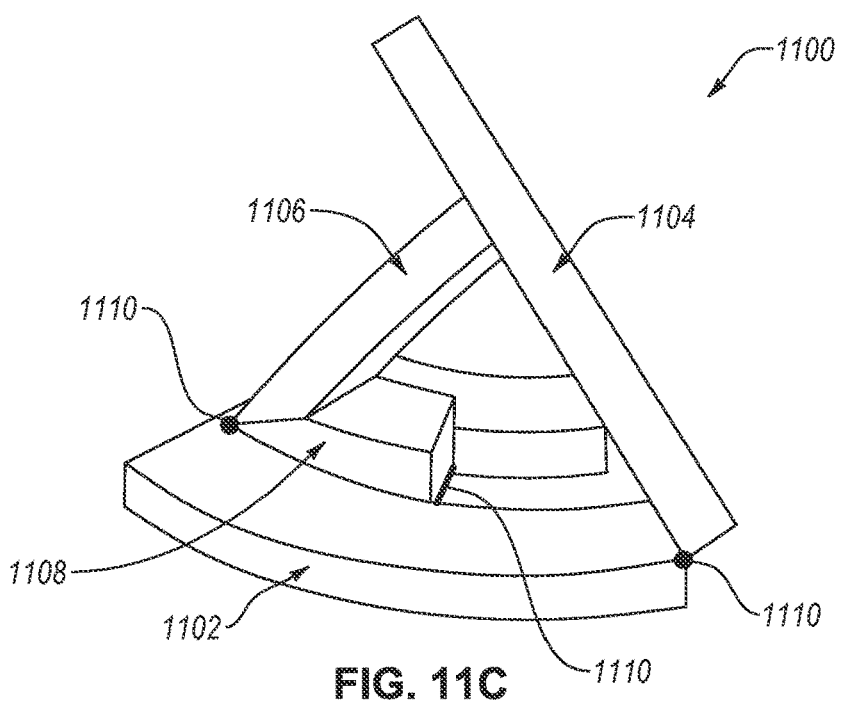

Similar to the planar deployable structures disclosed herein, the spherical deployable structures disclosed herein may exhibit a flat-folded state. For example, FIGS. 11A-11C are isometric views of a deployable structure 1100 exhibiting a flat-folded state, a folded state, and a deployed state, respectively, according to an embodiment. Except as otherwise disclosed herein, the deployable structure 1100 is the same as or substantially similar to any of the deployable structures disclosed herein. The deployable structure 1100 includes a base member 1102, a first articulable member 1104, a second articulable member 1106, and an interference member 1108. These members of the deployable structure 1100 are articulably connected together using hinges 1110.

The deployable structure 1100 includes a flat-folded state (FIG. 11A), a folded state (FIG. 11B), and a deployed state (FIG. 11C). The deployable structure 1100 may switch between the flat-folded state and the folded state and may switch between the folded state and the deployed state. In other words, the folded state is a state between the flat-folded state and the deployed state.

Generally, switching the deployable structure 1100 from the folded state to the flat-folded state increases the overall thickness and decreases the overall length of the deployable structure 1100. Also, switching the deployable structure 1100 from the folded state to the flat-folded state may not significantly affect the compactness of the deployable structure. Allowing the deployable structure 1100 to switch between the folded state and the flat-folded state may facilitate storage and handling of the deployable structure 1100. For example, the deployable structure 1100 may, in some instances, be easier to store or handle when exhibiting the flat-folded state than when exhibiting the folded state, and vice versa.

The deployable structure 1100 may exhibit the flat-folded state when the first angle $\alpha_1$ equals the fourth angle $\alpha_4$ and the second angle $\alpha_2$ equals the third angle $\alpha_3$ (the angles $\alpha_1$, $\alpha_2$, $\alpha_3$, and $\alpha_4$ are shown in FIG. 9A). The deployable structure 1100 may also exhibit the flat-folded state when the hinges 1110 are disposed on an outer surface (e.g., the top or bottom surface of the members) of the deployable structure 1100.

It is noted that the spherical deployable structures disclosed herein may exhibit other features of the planar deployable structures disclosed herein. In an example, the spherical deployable structures disclosed herein may include at least one of a plurality of base members, a plurality of first articulable members, a plurality of second articulable members, or a plurality of interference members. In an example, the spherical deployable structures disclosed herein may have two or more degrees of freedom and/or a plurality of deployed states. In an example, the spherical deployable structures may include a crease joint or be "inverted."

Figure 12A:
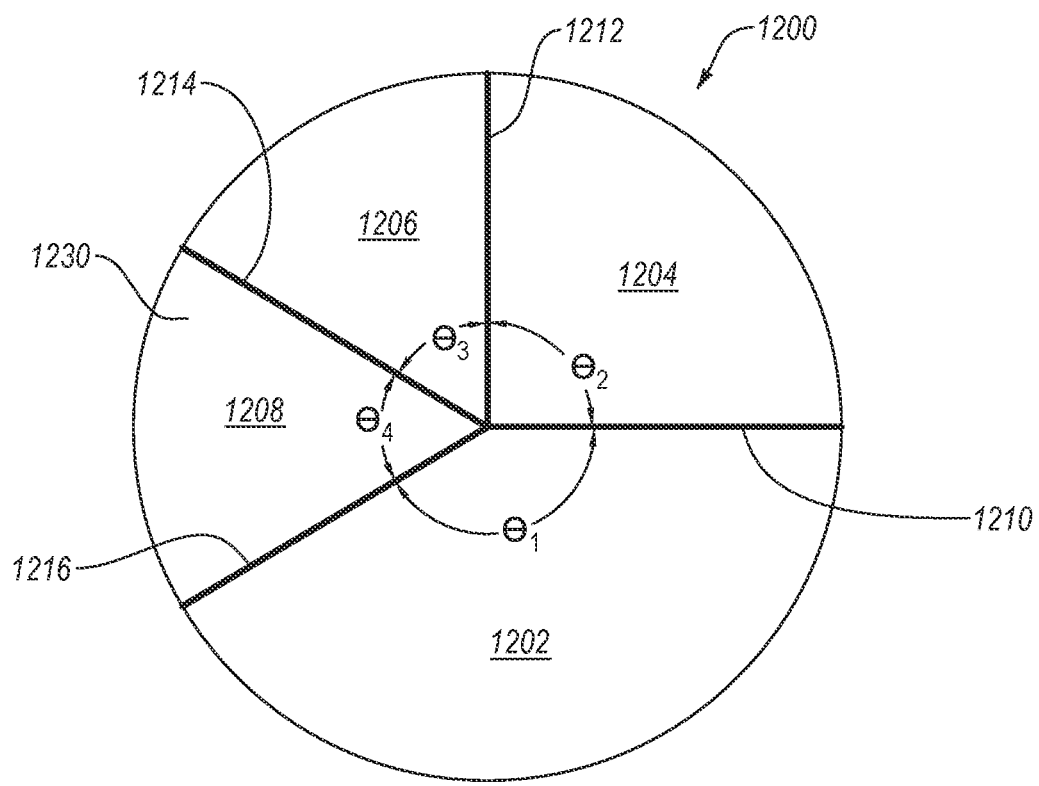
FIGS. 12A and 12B are schematics of a sector deployable structure in the folded and deployed states thereof, respectively, according to an embodiment.
Figure 12B:
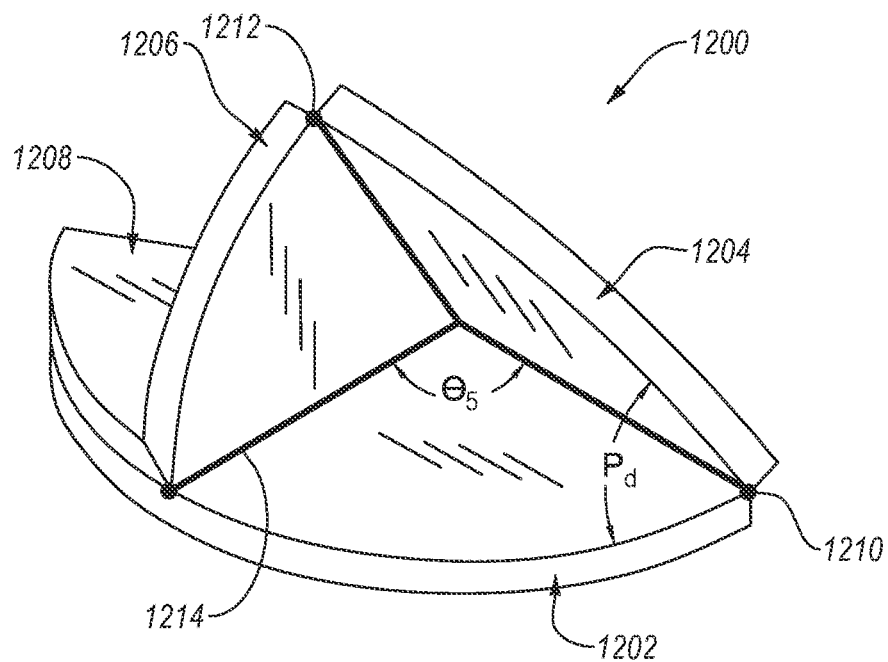

The deployable structures disclosed herein may also be sector deployable structures. Sector deployable structures utilize the thickness of the members to allow for self-interference to block motion when the sector deployable structures are in the deployed state. FIGS. 12A and 12B are schematics of a sector deployable structure 1200 in the folded and deployed states thereof, respectively, according to an embodiment. Except as otherwise disclosed herein, the deployable structure 1200 is the same as or substantially similar to any of the deployable structures disclosed herein. The deployable structure 1200 includes a base member 1202, a first articulable member 1204, a second articulable member 1206, and an interference member 1208. The members of the deployable structure 1200 are articulable connected together via hinges. Similar to the other deployable structures disclosed herein, the deployable structure 1200 is configured to switch between folded (i.e., compact) and deployed (e.g., voluminous) states. The deployable structure 1200 switches between the folded and deployed states thereof by rotating the members thereof about the hinges, similar to the other deployable structures disclosed herein.

The hinges of the deployable structure 1200 may include a first hinge 1210, a second hinge 1212, a third hinge 1214, and a fourth hinge 1216. The base member 1202 may be articulably connected to the first articulable member 1204 using a first hinge 1210, the first articulable member 1204 may be articulably connected to the second articulable member 1206 using a second hinge 1212, the second articulable member 1206 may be articulably connected to the interference member 1208 via a third hinge 1214, and the interference member 1208 may be articulably connected to the base member 1202 using a fourth hinge 1216.

The hinges of the deployable structure 1200 may be disposed on the same plane since disposing the hinges of the deployable structure on two or more planes may inhibit switching the deployable structure 1200 between the folded and deployed states thereof. For example, the hinges may be disposed adjacent to one of the top or bottom surfaces of their respective members, which may facilitate manufacturing of the deployable structure 1200 since the hinge ends of the members do not need to be rounded or tapered.

The axes of the first, second, third, and fourth hinges 1210, 1212, 1214, 1216 may generally intersect at a single (e.g., central) point 1258. The hinges intersecting at the single point 1258 causes the members of the deployable structure 1200 to exhibit a shape that corresponds to a slice of the overall shape of the deployable structure 1200 when the deployable structure 1200 is in the folded state. For example, as illustrated, the deployable structure 1200 exhibits a generally circular shape when in the folded state. In such an example, the hinges cause each of the members to exhibit a generally pie-like shape (e.g., arcuate shape). It is noted that the deployable structure 1200 may exhibit a non-circular shape (e.g., oval, square, etc.) when in the folded state and, thus, the members of the deployable structure 1200 may exhibit a shape other than the generally pie-like shape illustrated in FIGS. 12A and 12B.

The base member 1202 may exhibit a first angle $\theta_1$ measured between the axes of the first and fourth hinges 1210, 1216, the first articulable member 1204 exhibits a second angle $\theta_2$ measured between the axes of the first and second hinges 1210, 1212, the second articulable member 1206 exhibits a third angle $\theta_3$ measured between the axes of the second and third hinges 1212, 1214, and the interference member 1208 exhibits a fourth angle $\theta_4$ measured between the third and fourth hinges 1214, 1216. The first, second, third, and fourth angles $\theta_1$, $\theta_2$, $\theta_3$, $\theta_4$ are selected such that $\theta_1+\theta_2+\theta_3+\theta_4=2\eta$.

The deployable structure 1200 may exhibit a dihedral angle $\rho_d$ when the deployable structure 1200 is in the deployed state. The dihedral angle $\rho_d$ is the smallest angle measured between the base member 1202 and the first articulable member 1204 (e.g., between the top surface 1218 and the top surface 1222) when the deployable structure 1200 is in the deployed state. The deployable structure 1200 also exhibits a fifth angle $\theta_5$ measured between the first hinge 1210 and the third hinge 1212 when the deployable structure 1200 is in the deployed state. The dihedral angle $\rho_d$ and the fifth angle $\theta_5$ depend on the first angle $\theta_1$, the second angle $\theta_2$, the third angle $\theta_3$, and the fourth angle $\theta_4$ according to the equations:

$$\theta_5 = \theta_1 - \theta_4$$

$$\cos(\rho_d) = \frac{\cos(\theta_3) - \cos(\theta_2)\cos(\theta_5)}{\sin(\theta_4)\sin(\theta_5)}$$

Thus, the first angle $\theta_1$, the second angle $\theta_2$, the third angle $\theta_3$, and the fourth angle $\theta_4$ may be selected based on the desired dihedral angle $\rho_d$ and the desired fifth angle $\theta_5$, and vice versa.

As previously discussed, the deployable structure 1200 is configured to between the folded state (FIG. 12A) and the deployed state (FIG. 12B). In an example, the deployable structure 1200 may be configured to exhibit a more compact state (e.g., occupy a smaller volume) when the deployable structure 1200 is in the folded state than when in the deployed state. In an example, the deployable structure 1200 may exhibit a significantly smaller thickness (measured parallel to a thickness of the base member 1202) when in the folded state than when in the deployed state. In an example, the deployable structure 1200 may exhibit a larger maximum length (measured perpendicular to the thickness) when in the folded state than when in the deployed state. In an example, the deployable structure 1200 may exhibit a generally flat (e.g., planar) shape when in the folded state.

The deployable structure 1200 may switch between the folded and deployed states responsive to movement of the base member 1202, the first articulable member 1204, the second articulable member 1206, and the interference member 1208. For example, rotating the base member 1202, the first articulable member 1204, the second articulable member 1206, and the interference member 1208 about their respective hinges causes the deployable structure 1200 to switch between the deployed state and the folded state. The deployable structure 1200 may have only a single degree of freedom.

In the particular illustrated embodiment, the deployable structure 1200 switches from the folded state to the deployed state when at least one of the first articulable member 1204 is rotated about first hinge 1210 to decrease the inner angle between the base member 1202 and the first articulable member 1204, the second articulable member 1206 is rotated about the second hinge 1210 to decrease the inner angle between the first and second articulable member 1204, 1206, the interference member 1208 is rotated about the third hinge 1214 such that the inner angle between the second articulable member 1206 and the interference member 1208 decreases, or the interference member 1208 is rotated about the fourth hinge 1216 until the top surface 1230 of the interference member 1208 contacts the base member 1202. It is noted that the inner angles refers to the minimum angle between the members when the deployable structure 1200 is in the deployed state. The deployable structure 1200 switches from the deployed state to the folded state by reversing the above process.

As discussed above, the interference member 1208 may be configured to abut the base member 1202 when the deployable structure 1200 is in the deployed state. In particular, causing the interference member 1208 to contact the base member 1202 prevents further rotation of the interference member 1208 relative to the base member 1202 which, in turn, prevents further rotation of the first articulable member 1204 and the second articulable member 1206. The prevention of further rotation of the first articulable member 1204, the second articulable member 1206, and the interference member 1208 causes the deployable structure 1200 to exhibit a relatively rigid and stable deployed state.

The deployable structure 1200 may exhibit one or more intermediate states between the folded state and the deployed state. Generally, the deployable structure 1200 may be unable to maintain the intermediate states thereof when no load or a relatively small load is applied to the intermediate states. For example, the deployable structure 1200 may move from the intermediate state to the folded or deployed state when no load or a relatively small load is applied to the intermediate states.

Figure 13A:
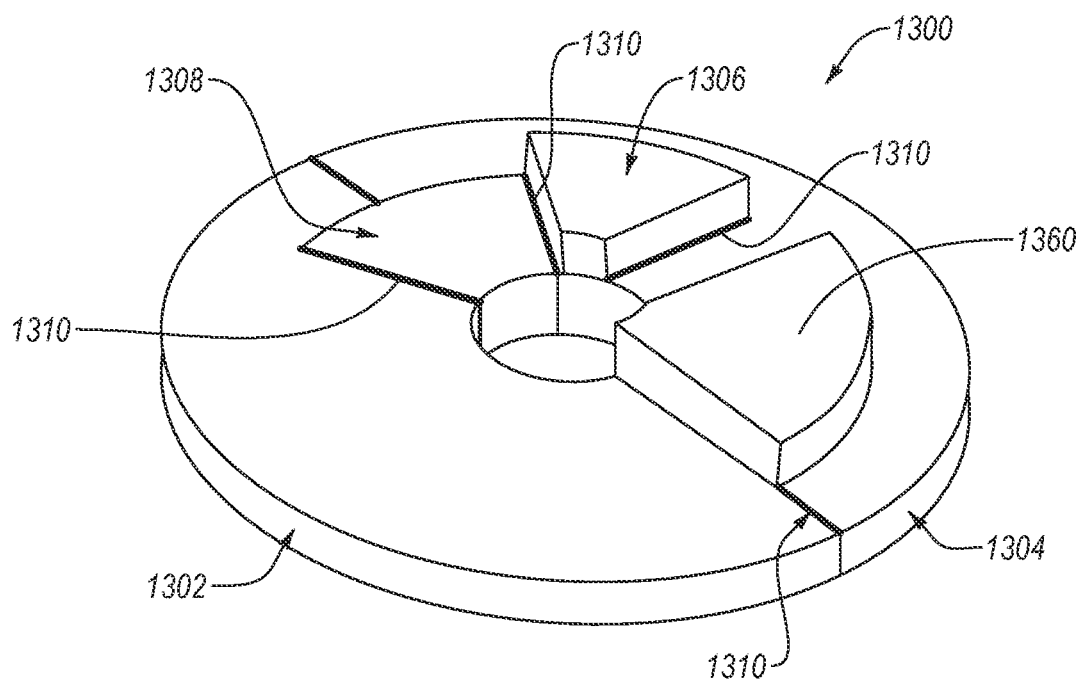
FIGS. 13A and 13B are isometric views of a deployable structure in a folded state and a deployed state, respectively, according to an embodiment.
Figure 13B:
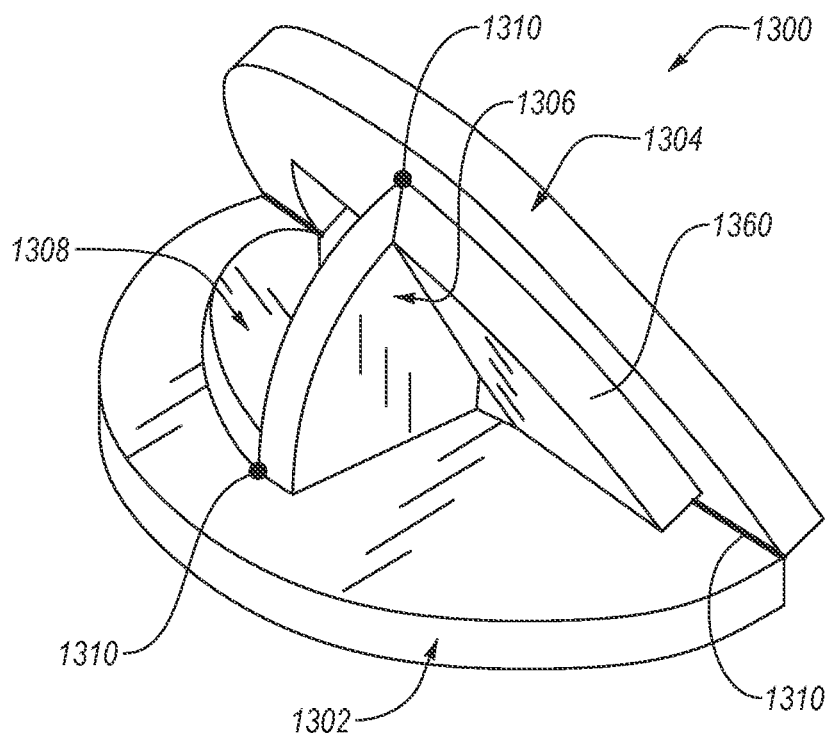

Generally, the members of the sector deployable structures disclosed herein are generally disposed in a single plane when the sector deployable structures are in the folded state. However, one or more of the members of the deployable structure may be disposed in two or more planes when the sector deployable structure is in the folded state. FIGS. 13A and 13B are isometric views of a deployable structure 1300 in a folded state and a deployed state, respectively, according to an embodiment. Except as otherwise disclosed herein, the deployable structure 1300 is the same as or substantially similar to any of the deployable structures disclosed herein. The deployable structure 1300 includes a base member 1302, a first articulable member 1304, a second articulable member 1306, and an interference member 1308. The members of the deployable structure 1300 may be articulably connected together using hinges 1310.

As previously discussed, the hinges 1310 are disposed on the same plane. At least a portion of one or more of the members of the deployable structure 1300 may be disposed in a plane below the hinges 1310 and at least a portion of one or more of the members of the deployable structure 1300 may be disposed in a plane above the hinges 1310. For example, as illustrated, the base member 1302, at least a portion of the first articulable member 1304, and the interference member 1308 are disposed below the hinges 1310 while the second articulable member 1306 is disposed above the hinges 1310. Disposing the second articulable member 1306 above the hinges 1310 allows the first articulable member 1304 to exhibit a maximum angular width that is greater than the angular width measured between the hinges 1310 that are connected to the first articulable member 1304. The greater angular width of the first articulable member 1304 may provide a larger surface area that may be used to attach a component (e.g., a table leg or table top when the deployable structure 1300 forms part of a table, an antenna when the deployable structure 1300 forms part of an antenna system) to the deployable structure 1300.

One or more of the members of the deployable structure 1300 may include at least one projection 1360 extending from the top surfaces thereof. The projection 1360 may be engaged with (e.g., integrally formed with or attached to) their respective members. The projection 1360 allows a portion of the members to which the projection 1360 is engaged to extend above the hinges 1310. For example, as illustrated, the first articulable member 1304 includes the projection 1360 and the projection 1360 allows a portion of the first articulable member 1304 to be disposed above and below the hinges 1310. In other words, the projection 1360 effectively increases the thickness of the member to which the projection 1360 is connected. The projection 1360 may allow for additional contact between adjacent members thereby facilitating transfer of loads directly between the members instead through the hinges 1310.

Figure 14A:
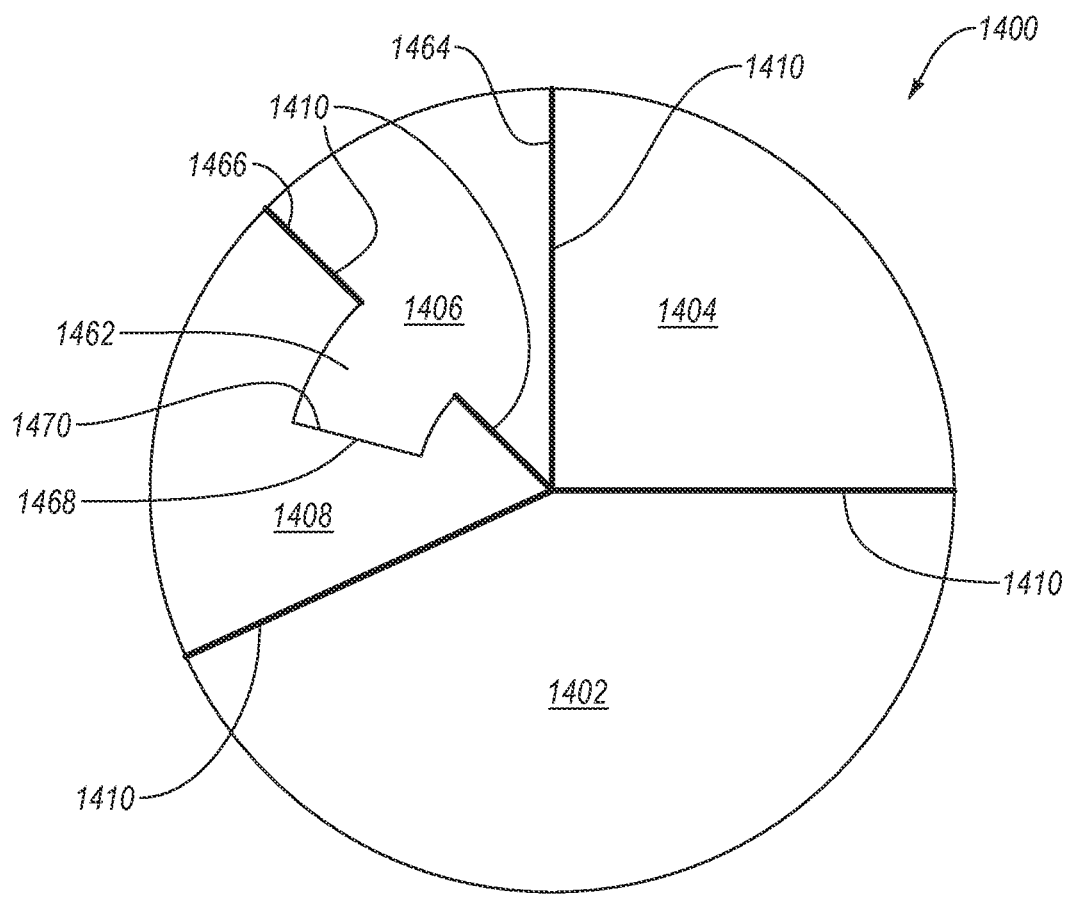
FIGS. 14A and 14B are isometric views of a deployable structure including a tab when the deployable structure is in the folded and deployed states thereof, respectively, according to an embodiment.
Figure 14B:
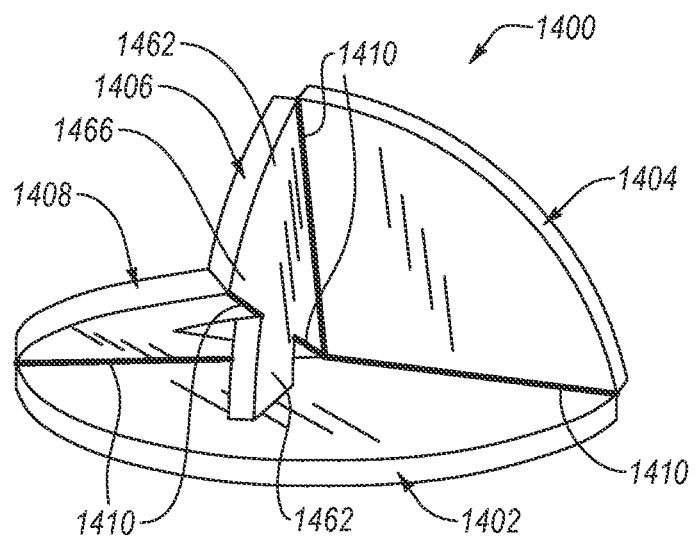

The sector deployable structures illustrated in FIGS. 12-14B may have motion thereof limited by self-interference between the base member and the second articulable member. Similarly, the interference members of such sector deployable structures may need to rotate about 180° to contact the base member. The self-interference between the base member and the second articulable member and the 180° rotation of the interference member reduces possible surface contact within such sector deployable structures and constrains the possible positions of the hinges. To remedy these issues, the sector deployable structures disclosed herein may include a tab extending from the second articulable member that is configured to contact the base member. The tab may prevent the self-interference between the base member and the rest of the second articulable member and the possible need for the interference member to rotate 180°. For example, FIGS. 14A and 14B are isometric views of a deployable structure 1400 including a tab 1462 when the deployable structure 1400 is in the folded and deployed states thereof, respectively, according to an embodiment. Except as otherwise disclosed herein, the deployable structure 1400 is the same as or substantially similar to any of the deployable structures disclosed herein. The deployable structure 1400 includes a base member 1402, a first articulable member 1404, a second articulable member 1406, and an interference member 1408. The members of the deployable structure 1400 may be articulably connected together using hinges 1410.

The second articulable member 1406 includes a first side 1464 adjacent to the first articulable member 1404 and a second side 1466 opposite the first side 1464 that is adjacent to the interference member 1408. The second articulable member 1406 includes the tab 1462 extending from the second side 1466 of the second articulable member 1406. The interference member 1408 may define a cutout 1468 or recess configured to receive the tab 1462 when the deployable structure 1400 is in the folded state. In an embodiment, the edge 1470 of the tab 1462 may be aligned with the single point 1458 such that a line extending from and parallel to the edge 1470 generally intersects the axes of the hinges 1410 at the single point 1458. In an embodiment, the edge 1470 of the tab 1462 is selected to be parallel to the base member 1402 when the deployable structure 1400 is in the deployed state.

The tab 1462 causes the second articulable member 1406 to come in contact with the base member 1402 before the interference member 1408 is able to contact the base member 1402. It is noted that the tab 1462 effects the fifth angle $\theta_5$ and the dihedral angle $\rho_d$ such that the equations for the sector deployable structure provided above with regards to the deployable structure 1200 do not apply to the deployable structure 1400. The equations that govern the deployable structure 1400 are disclosed in David Wayne Andrews, *Incorporating Stability in Deployable Origami-Based Engineering Applications*, BYU ScholarsArchive (2020), the disclosure of which was previously incorporated herein.

Figure 15A:
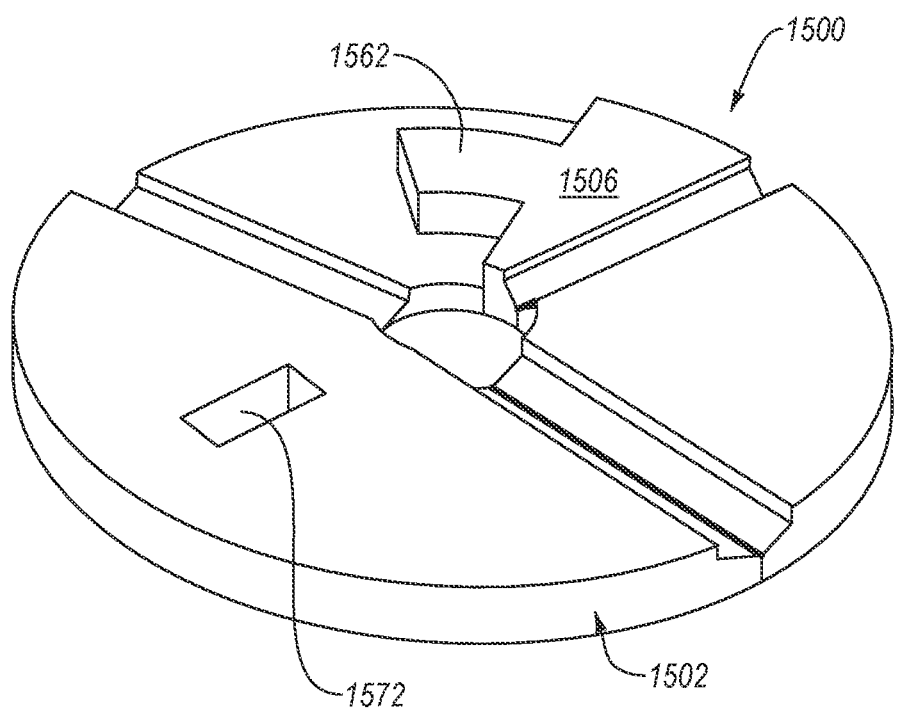
FIGS. 15A and 15B are isometric view of a deployable structure in the folded and deployed states thereof, respectively, according to an embodiment.
Figure 15B:
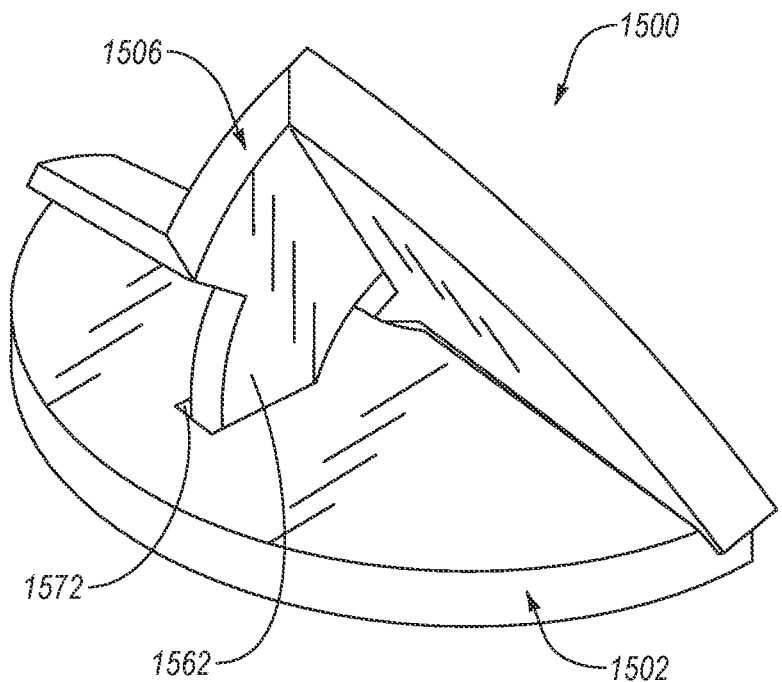

FIGS. 15A and 15B are isometric views of a deployable structure in the folded and deployed states thereof, respectively, according to an embodiment. Except as otherwise disclosed herein, the deployable structure 1500 is the same as or substantially similar to the deployable structure 1400 illustrated in FIGS. 14A and 14B. The base member 1502 of the deployable structure 1500 defines a recess 1572 that is configured to receive the tab 1562 of the second articulable member 1506 when the deployable structure 1500 is in the deployed state thereof. Receiving the tab 1562 in the recess 1572 may cause the deployable structure 1500 to be more securely and rigidly maintained in the deployed state.

Figure 16A:
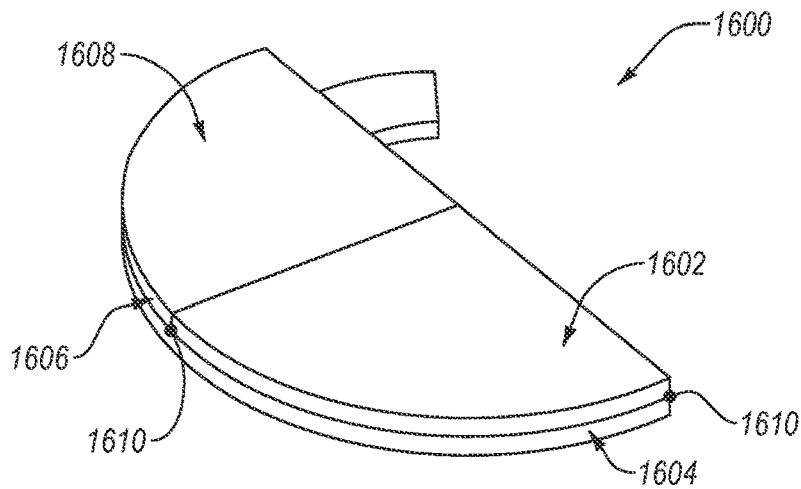
FIGS. 16A-16C are isometric views of a deployable structure exhibiting a flat-folded state, a folded state, and a deployed state, respectively, according to an embodiment.
Figure 16B:
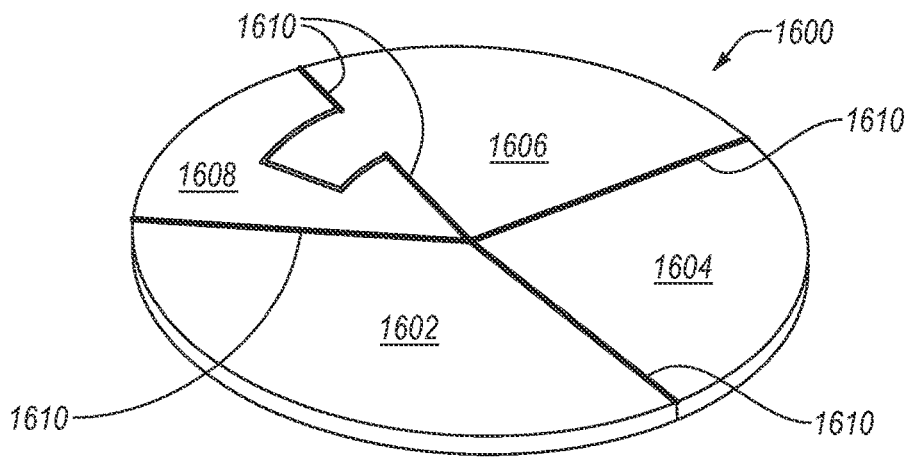
Figure 16C:
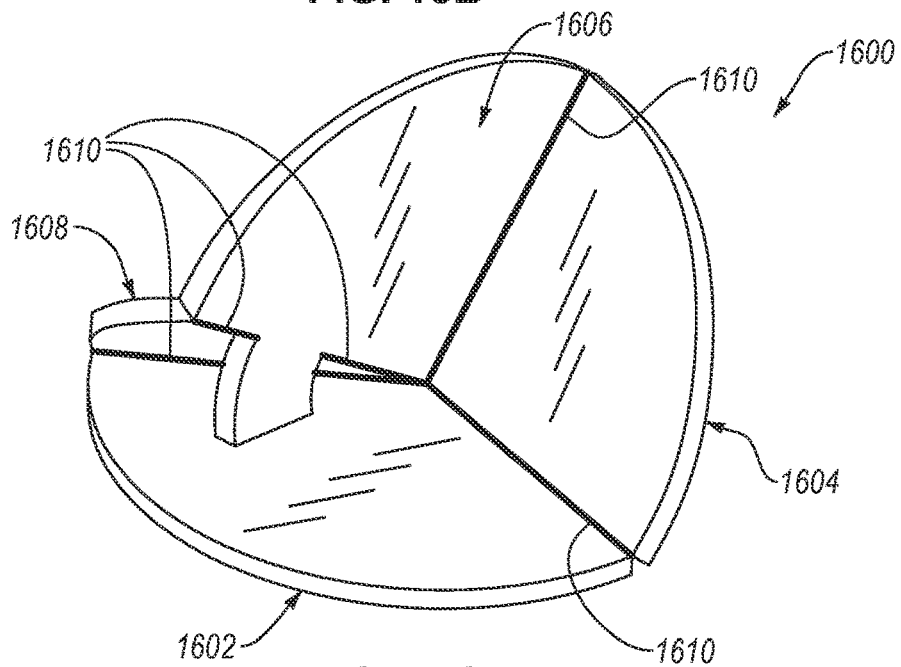

Similar to the other deployable structures disclosed herein, the sector deployable structures disclosed herein may exhibit a flat-folded state. For example, FIGS. 16A-16C are isometric views of a deployable structure 1600 exhibiting a flat-folded state, a folded state, and a deployed state, respectively, according to an embodiment. Except as otherwise disclosed herein, the deployable structure 1600 is the same as or substantially similar to any of the deployable structures disclosed herein. The deployable structure 1600 includes a base member 1602, a first articulable member 1604, a second articulable member 1606, and an interference member 1608. These members of the deployable structure 1600 are articulably connected together using hinges 1610.

The deployable structure 1600 includes a flat-folded state (FIG. 16A), a folded state (FIG. 16B), and a deployed state (FIG. 16C). The deployable structure 1600 may switch between the flat-folded state and the folded state and may switch between the folded state and the deployed state. In other words, the folded state is a state between the flat-folded state and the deployed state.

Generally, switching the deployable structure 1600 from the folded state to the flat-folded state increases the overall thickness and decreases the overall length of the deployable structure 1600. Also, switching the deployable structure 1600 from the folded state to the flat-folded state may not significantly affect the compactness of the deployable structure. Allowing the deployable structure 1600 to switch between the folded state and the flat-folded state may facilitate storage and handling of the deployable structure 1600. For example, the deployable structure 1600 may, in some instances, be easier to store or handle when exhibiting the flat-folded state than when exhibiting the folded state, and vice versa.

The deployable structure 1600 may exhibit the flat-folded state when the deployable structure 1600 includes a pair of collinear hinges 1610. In other words, the deployable structure may exhibit the flat-folded state when the sum of the first angle $\theta_1$ and the second angle $\theta_2$ equals the sum of the third angle $\theta_3$ and the fourth angle $\theta_4$, and the sum of the first angle $\theta_1$ and the second angle $\theta_2$ equals it when the first, second, third, and fourth angles $\theta_1$, $\theta_2$, $\theta_3$, $\theta_4$ are in radians (i.e., $\theta_1+\theta_2=\theta_3+\theta_4=\pi$). The first, second, third, and fourth angles $\theta_1$, $\theta_2$, $\theta_3$, $\theta_4$ are shown in FIG. 12A. The deployable structure 1600 may also exhibit the flat-folded state when the hinges 1610 are disposed on an outer surface (e.g., the top or bottom surface of the members).

Figure 17:
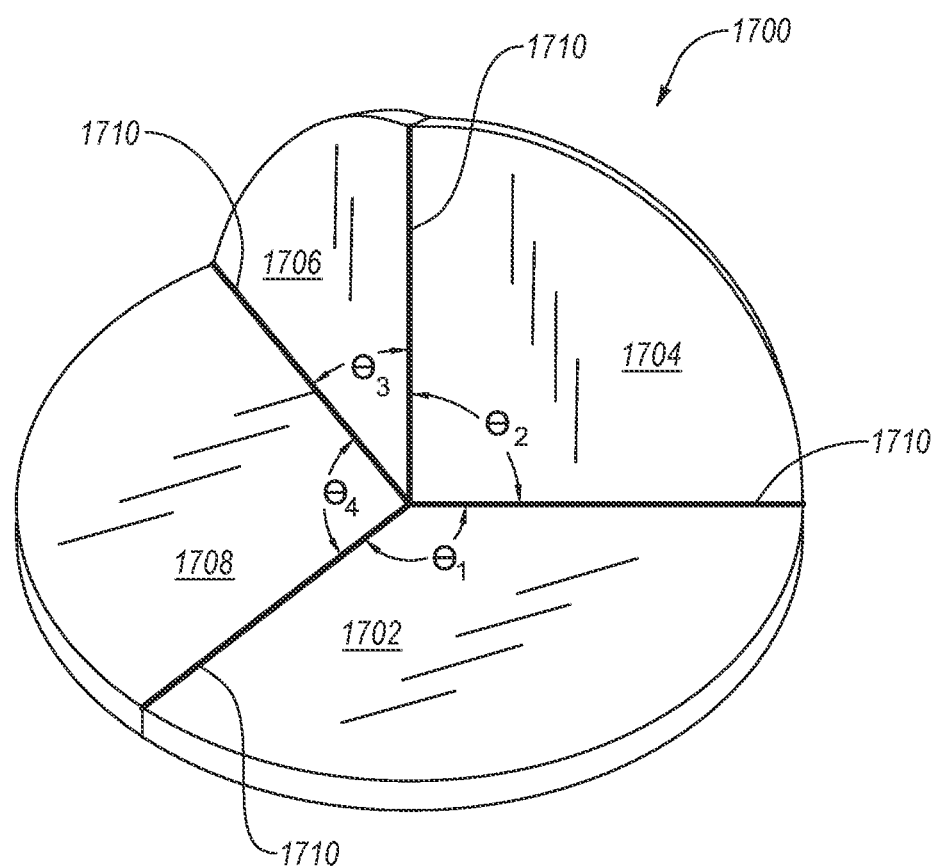
FIG. 17 is an isometric view of a deployable structure that is "inverted," according to an embodiment.

The sector deployable structures disclosed herein may be "inverted," that is, switched directly from the flat-folded state to the deployed state. FIG. 17 is an isometric view of a deployable structure 1700 that is "inverted," according to an embodiment. Except as otherwise disclosed herein, the deployable structure 1700 is the same or substantially similar to any of the deployable structures disclosed herein. The deployable structure 1700 includes a base member 1702, a first articulable member 1704, a second articulable member 1706, and an interference member 1708. These members of the deployable structure 1700 are articulably connected together using hinges 1710. The base member 1702 exhibits a first angle $\theta_1$, the first articulable member 1704 exhibits a second angle $\theta_2$, the second articulable member 1706 exhibits a third angle $\theta_3$, and the interference member 1708 exhibits a fourth angle $\theta_4$. To allow the deployable structure 1700 to be inverted, the first, second, third, and fourth angles $\theta_1$, $\theta_2$, $\theta_3$, $\theta_4$ are selected according to the equation $\theta_1-\theta_2+\theta_3-\theta_4=0$.

Figure 18A:
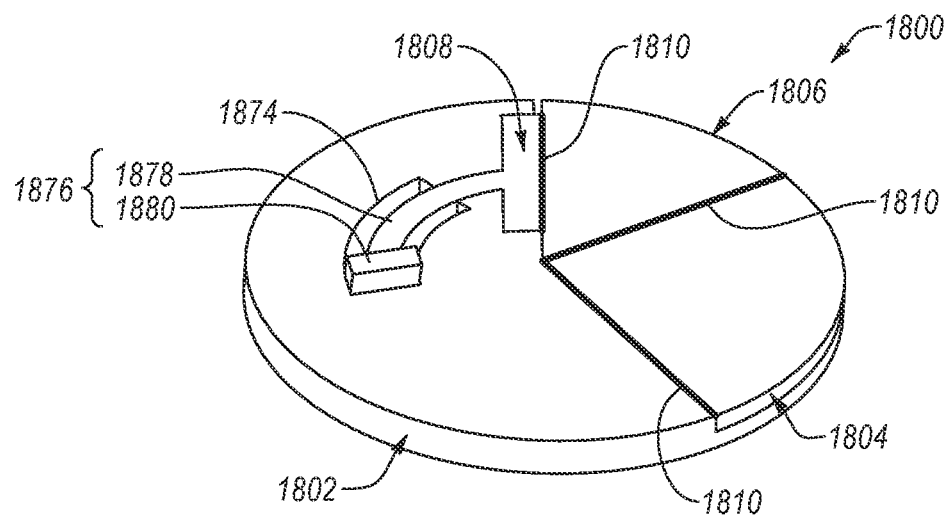
FIGS. 18A and 18B are isometric views of a deployable structure, according to an embodiment.
Figure 18B:
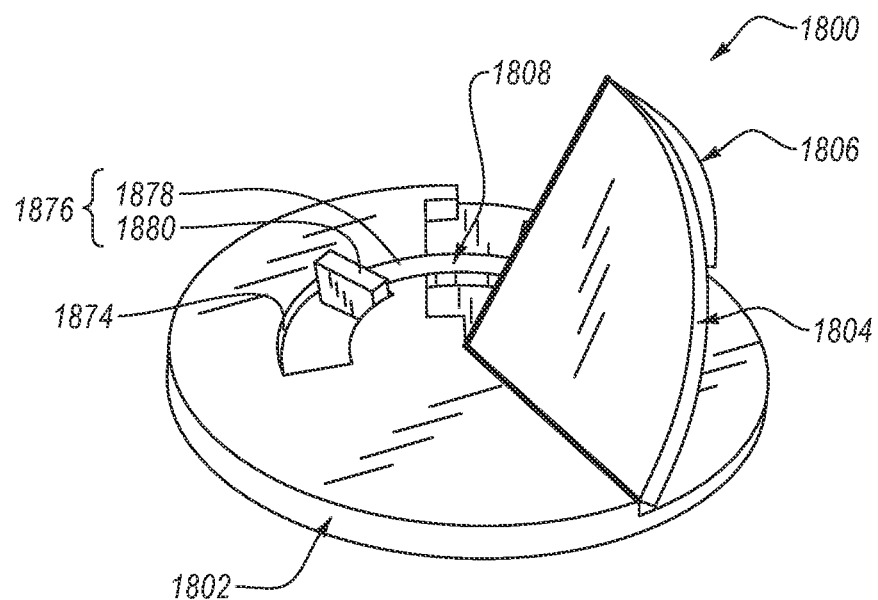

The deployable structures illustrated in FIGS. 1-17 includes the members thereof connected together via hinges. However, it is noted that the members of the deployable structures disclosed herein may be connected together using techniques other than hinges. For example, FIGS. 18A and 18B are isometric views of a deployable structure 1800, according to an embodiment. Except as otherwise disclosed herein, the deployable structure 1800 is the same or substantially similar to any of the deployable structures disclosed herein. The deployable structure 1800 includes a base member 1802, a first articulable member 1804, a second articulable member 1806, and an interference member 1808.

In an embodiment, one or more of the members of the deployable structure 1800 are slidably connected together. In such an embodiment, sliding the two members relative to each other may switch the deployable structure 1800 between the folded and deployed state. In an example, as illustrated, the base member 1802 and the interference member 1808 are slidably connected together instead of articulably connected together. The members of the deployable structure 1800 that are not slidably connected together may be articulably connected together using one or more hinges 1810.

In a particular example, the base member 1802 defines a recess 1874 that includes a first wide portion and a second narrow portion. The first wide portion may exhibit a width that is greater than the second narrow portion. The interference member 1808 may include an arm 1876 extending from the rest of the interference member 1808. The arm 1876 is configured to be disposed in the recess 1874. The arm 1876 may include an elongated portion 1878 and a head 1880. The elongated portion 1878 may exhibit a width that is sufficiently small so that the elongated portion 1878 may be positioned within the second narrow portion of the recess 1874. The head 1880 may exhibit a width that is sufficiently small to fit within the first wide portion of the recess 1874 and too large to fit within the second narrow portion of the recess 1874. Such a structure allows the interference member 1808 to slide relative to the base member 1802. For example, the arm 1876 may move within the recess 1874 by increasing or decreasing the distance between the second narrow portion of the recess 1874 and the head 1880 of the arm 1876. In particular, increasing the distance between the second narrow portion of the recess 1874 and the head 1880 of the arm 1876 switches the deployable structure 1800 from the deployed state to the folded state, and decreasing the distance between the second narrow portion of the recess 1874 and the head 1880 of the arm 1876 switches the deployable structure 1800 from the folded state to the deployed state. It is noted that the thickness of the portions of the base member 1802 defining the recess 1874 and the thickness of the arm 1876 creates an interference when the head 1880 abuts the portions of the base member 1802 defining the second narrowed portion of the recess 1874 which, in turn, maintains the deployable structure 1800 in the deployed state. It is noted that disposing the arm 1876 within the recess 1874 makes the deployable structure 1800 more compact than if the arm 1876 was disposed on top of the base member 1802.

It is noted that the sector deployable structures disclosed herein may exhibit other features of the planar deployable structures disclosed herein. In an example, the sector deployable structures disclosed herein may include at least one of a plurality of base members, a plurality of first articulable members, a plurality of second articulable members, or a plurality of interference members. In an example, the sector deployable structures disclosed herein may have two or more degrees of freedom and/or a plurality of deployed states.

It is noted that the deployable structures may include components other than what is illustrated in FIGS. 1-18B. In an example, the deployable structures disclosed herein may include one or more springs configured to bias the deployable structure towards the compact or deployed state thereof. In an example, the deployable structures disclosed herein may include trusses, braces, or other supports that are configured to maintain the deployable structures in the deployed state. In an example, the deployable structures may include straps configured to maintain the deployable structures in the compact or deployed states thereof.

The deployable structures disclosed herein may be used in a variety of systems and devices. In an embodiment, the deployable structures disclosed herein may be used to replace hinges in a conventional device or system. An example of such a conventional device or system is a table, wherein the base member of a deployable structure is attached to either the table top or a leg of the table while the first articulable member is attached to the other of the table top or the leg. In an embodiment, the deployable structure may be used to form at least a portion of a frame of a conventional device or system that is configured to exhibit a compact and deployed configuration. An example of such a conventional device or system includes a portable antenna array wherein the base member is configured to be attached to or rest on a surface (e.g., ground or another structure) and the first articulable member is attached to the antenna(s). In an embodiment, the deployable structures disclosed herein may be used to form book ends, a mobile phone holder, furniture, or habitable structures.

While various aspects and embodiments have been disclosed herein, other aspects and embodiments are contemplated. The various aspects and embodiments disclosed herein are for purposes of illustration and are not intended to be limiting.

Terms of degree (e.g., "about," "substantially," "generally," etc.) indicate structurally or functionally insignificant variations. In an example, when the term of degree is included with a term indicating quantity, the term of degree is interpreted to mean±10%, ±5%, or +2% of the term indicating quantity. In an example, when the term of degree is used to modify a shape, the term of degree indicates that the shape being modified by the term of degree has the appearance of the disclosed shape. For instance, the term of degree may be used to indicate that the shape may have rounded corners instead of sharp corners, curved edges instead of straight edges, one or more protrusions extending therefrom, is oblong, is the same as the disclosed shape, etc.

What is claimed is:

1. A deployable structure, comprising:
   at least one base member;
   at least one first articulable member articulably connected to the at least one base member at a first hinge;
   at least one second articulable member articulably connected to the at least one first articulable member at a second hinge;
   at least one interference member articulably connected to the at least one second articulable member at a third hinge and connected to the at least one base member, the at least one interference member exhibiting a thickness measured perpendicularly to a longitudinal axis of the at least one interference member and between a top surface and a bottom surface of the at least one interference member;
   wherein the deployable structure is configured to switch from at least one compact state to a deployed state; and
   wherein, when the deployable structure is in the deployed state, at least one of:
      the top surface of the at least one interference member abuts the base member; or
      the at least one second articulable member includes a tab abutting the base member, the at least one interference member defining a cutout configured to receive the tab when the deployable structure is in the at least one compact state; and
   wherein the at least one interference member abutting the base member and/or the tab abutting the base member prevents further rotation of the at least one interference member relative to the at least one second articulable member via the third hinge in a direction that caused the deployable structure to switch from the at least one compact state to the deployable state.

2. The deployable structure of claim 1, wherein the at least one interference member is articulably connected to the at least one base member using a fourth hinge.

3. The deployable structure of claim 2, wherein the interference member is configured to rotate about 180° about the fourth hinge.

4. The deployable structure of claim 1, wherein the at least one interference member is articulably connected to the at least one base member using a crease joint.

5. The deployable structure of claim 1, wherein the at least one interference member is slidably connected to the at least one base member.

6. The deployable structure of claim 1, wherein each of the first hinge, the second hinge, and the third hinge lie in the same plane when the deployable structure is in the at least one compact state.

7. The deployable structure of claim 1, wherein at least one of the first hinge, the second hinge, or the third hinge lie in a first plane and at least one other of the first hinge, the second hinge, or the third hinge lie in a second plane that is different than the first plane when the deployable structure is in the at least one compact state.

8. The deployable structure of claim 1, wherein a hinge end of one or more at least one base member, the at least one first articulable member, the at least one second articulable member, or the at least one interference member is tapered.

9. The deployable structure of claim 1, wherein the deployable structure is a planar deployable structure, and wherein:
the at least one base member exhibits a first length measured from the first hinge to the fourth hinge;
the at least one first articulable member exhibits a second length measured from the first hinge to the second hinge;
the at least one second articulable member exhibits a third length measured from the second hinge to the third hinge;
the at least one interference member exhibits a fourth length measured from the third hinge to a fourth hinge that articulably connects the at least one interference member to the at least one base member; and
a sum of the first length and the second length is substantially equal to a sum of the third length and the fourth length.

10. The deployable structure of claim 9, wherein the first length is equal to the fourth length and the second length is equal to the third length.

11. The deployable structure of claim 9, wherein the at least one first articulable member includes a plurality of first articulable members that are articulably connected together.

12. The deployable structure of claim 1, wherein:
the deployable structure is a spherical deploying structure; and
axes of the first hinge, the second hinge, and the third hinge intersect at a single general point.

13. The deployable structure of claim 12, wherein:
the at least one base member exhibits a first angle measured between the axis of the first hinge and an axis of a fourth hinge that articulably connects the at least one interference member with the at least one base member;
the at least one first articulable member exhibits a second angle measured between the axis of the first hinge and the axis of the second hinge;
the at least one second articulable member exhibits a third angle measured between the axis of the second hinge and the axis of the third hinge;
the at least one interference member exhibits a fourth angle measured between the axis of the third hinge and the axis of the fourth hinge; and
a sum of the first angle and the second angle is equal to a sum of the third angle and the fourth angle.

14. The deployable structure of claim 12, wherein the first angle is equal to the fourth angle and the second angle is equal to the third angle.

15. The deployable structure of claim 1, wherein the deployable structure is a sector panel deployable structure, wherein:
the at least one base member exhibits a first angle measured between an axis of the first hinge and an axis of a fourth hinge that connects the at least one base member to the at least one interference member;
the at least one first articulable member exhibits a second angle measured between the axis of the first hinge and an axis of the second hinge;
the at least one second articulable member exhibits a third angle measured between the axis of the second hinge and an axis of the third hinge;
the at least one interference member exhibits a fourth angle measured between the axis of the third hinge and the axis of a fourth hinge; and
a sum of the first angle, the second angle, the third angle, and the fourth angle is $2\pi$ when the first angle, the second angle, the third angle, and the fourth angle are in radians.

16. The deployable structure of claim 1, wherein at least one of:
the at least one base member defines a first recess configured to receive at least a portion of the at least one first articulable member or at least a portion of the at least one interference member when the deployable structure is in the at least one compact state; or
the at least one first articulable member defines a second recess configured to receive at least a portion of the at least one base member or at least a portion of the at least one second articulable member when the deployable structure is in the at least one compact state.

17. The deployable structure of claim 16, wherein:
the first recess configured to receive substantially all of the at least one interference member when the deployable structure is in the at least one compact state; and
the second recess configured to receive substantially all of the at least one second articulable member when the deployable structure is in the at least one compact state.

18. The deployable structure of claim 1, wherein the at least one compact state is a folded state.

19. The deployable structure of claim 1, wherein the at least one compact state includes a folded state and a flat-folded state, and wherein the deployable structure is configured to switch between the flat-folded state and the folded state and between the folded state and the deployed state.

20. The deployable structure of claim 1, wherein the at least one compact state includes a flat-folded state, and wherein the deployable structure is configured to switch directly from the flat-folded state to the deployed state.

21. A method of using a deployable structure, the method comprising:
providing the deployable structure, the deployable structure including:
at least one base member;
at least one first articulable member articulably connected to the at least one base member at a first hinge;

at least one second articulable member articulably connected to the at least one first articulable member at a second hinge;

at least one interference member articulably connected to the at least one second articulable member at a third hinge and connected to the at least one base member, the at least one interference member exhibiting a thickness measured perpendicularly to a longitudinal axis of the at least one interference member and between a top surface and a bottom surface; and switching the deployable structure from a compact state to a deployed state by at least one of:
- abutting the top surface of the at least one interference member against the base member; or
- abutting a tab of the at least one second articulable member against the base member, the at least one interference member defining a cutout configured to receive the tab when the deployable structure is in the at least one compact state; and wherein the at least one interference member abutting the base member and/or the tab abutting the base member prevents further rotation of the at least one interference member relative to the at least one second articulable member via the third hinge in a direction that caused the deployable structure to switch from the at least one compact state to the deployed state.

22. A deployable structure, comprising:

at least one base member;

at least one first articulable member articulably connected to the at least one base member at a first hinge;

at least one second articulable member articulably connected to the at least one first articulable member at a second hinge;

at least one interference member articulably connected to the at least one second articulable member at a third hinge and articulably connected to the at least one base member at a fourth hinge, the at least one interference member exhibiting a thickness measured perpendicularly to a longitudinal axis of the at least one interference member and between a top surface and a bottom surface;

wherein the deployable structure is configured to switch from at least one folded state to a deployed state, the top surface of the at least one interference member abutting a surface of the at least one base member when the deployable structure is in the deployed state, the at least one interference member abutting the base member preventing further rotation of the at least one interference member relative to the at least one second articulable member via the third hinge in a direction that caused the deployable structure to switch from the at least one compact state to the deployed state;

wherein the at least one base member defines a first recess configured to receive at least a portion of the at least one interference member when the deployable structure is in the at least one compact state and the at least one first articulable member defines a second recess configured to receive at least a portion of the at least one second articulable member when the deployable structure is in the at least one compact state.

23. The deployable structure of claim 1, wherein the at least one first articulable member includes a single first articulable member.

* * * * *